(12) United States Patent
Shida et al.

(10) Patent No.: US 9,380,137 B2
(45) Date of Patent: Jun. 28, 2016

(54) ELECTRONIC DEVICE

(71) Applicant: FUJITSU LIMITED, Kawasaki-shi, Kanagawa (JP)

(72) Inventors: Hayato Shida, Kawasaki (JP); Shingo Yamaguchi, Kawasaki (JP); Satoshi Kanbayashi, kawasaki (JP); Yasuhiro Ite, Chofu (JP); Satoshi Watanabe, Setagaya (JP); Takao Shinoda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 110 days.

(21) Appl. No.: 14/542,754

(22) Filed: Nov. 17, 2014

(65) Prior Publication Data

US 2015/0172427 A1    Jun. 18, 2015

(30) Foreign Application Priority Data

Dec. 18, 2013   (JP) ................................ 2013-261386

(51) Int. Cl.
*H04M 1/02* (2006.01)

(52) U.S. Cl.
CPC .......... *H04M 1/0249* (2013.01); *H04M 1/0274* (2013.01)

(58) Field of Classification Search
CPC combination set(s) only.
See application file for complete search history.

(56) References Cited

U.S. PATENT DOCUMENTS

| 5,997,318 | A | * | 12/1999 | Chou | ................ | H01R 13/5213 |
|---|---|---|---|---|---|---|
| | | | | | | 439/136 |
| 9,203,173 | B2 | * | 12/2015 | Wang | ................... | H01R 13/447 |
| 2009/0111539 | A1 | * | 4/2009 | Matsuda | ............... | G06F 1/1616 |
| | | | | | | 455/575.3 |
| 2009/0263994 | A1 | * | 10/2009 | Hsieh | ...................... | G06F 1/181 |
| | | | | | | 439/136 |
| 2010/0279527 | A1 | * | 11/2010 | Liu | ........................ | H01R 13/44 |
| | | | | | | 439/136 |

FOREIGN PATENT DOCUMENTS

JP        2011-159487 A    8/2011

* cited by examiner

*Primary Examiner* — Junpeng Chen
(74) *Attorney, Agent, or Firm* — Squire Patton Boggs (US) LLP

(57) ABSTRACT

An electronic device includes: a case including a wall portion including an opening, and a pair of longitudinal grooves, wherein each of the longitudinal grooves includes a first groove portion that is disposed with the opening between the first groove portions; a second groove portion that is contiguous to the first groove portion through an inclined groove wall; a lid that moves along the longitudinal grooves, and that is brought closer to the wall portion by the inclined groove wall under an action of moving the lid to the first groove portion; a resilient member that is provided at the lid, and that is compressed by the wall portion and the lid by the action of moving the lid closer to the wall portion; and a connection member that is connected to an electronic component inside the case, and that is exposed from the opening when the opening is opened.

15 Claims, 19 Drawing Sheets

ELECTRONIC DEVICE

CROSS-REFERENCE TO RELATED APPLICATION

This application is based upon and claims the benefit of priority of the prior Japanese Patent Application No. 2013-261386, filed on Dec. 18, 2013, the entire contents of which are incorporated herein by reference.

FIELD

The embodiments discussed herein are related to an electronic device.

BACKGROUND

An existing lid structure includes a curving groove extending towards one side of an opening of a case, and a straight groove branching from the curving groove and extending in a straight line toward the other side of the opening. In this lid structure, a lid provided with a waterproofing member is guided by the curving groove and the straight groove, and the opening is waterproofed by the waterproofing member.

RELATED PATENT DOCUMENTS

Japanese Laid-Open Patent Publication No. 2011-159487.

SUMMARY

According to an aspect of the embodiments, an electronic device includes: a case including a wall portion including an opening, and a pair of longitudinal grooves extending along a side face of the wall portion, wherein each of the longitudinal grooves includes a first groove portion that is disposed with the opening between the first groove portions; a second groove portion that is disposed at a position separated from the opening and is contiguous to the first groove portion through an inclined groove wall; a lid that moves along the longitudinal grooves, and that is brought closer to the wall portion by the inclined groove wall under an action of moving the lid to the first groove portion; a resilient member that is provided at the lid, and that is compressed by the wall portion and the lid at the periphery of the opening by the action of moving the lid closer to the wall portion; and a connection member that is electrically connected to an electronic component inside the case, and that is exposed from the opening when the opening is opened.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Explanation follows regarding an exemplary embodiment of technology disclosed herein.

Figure 1:
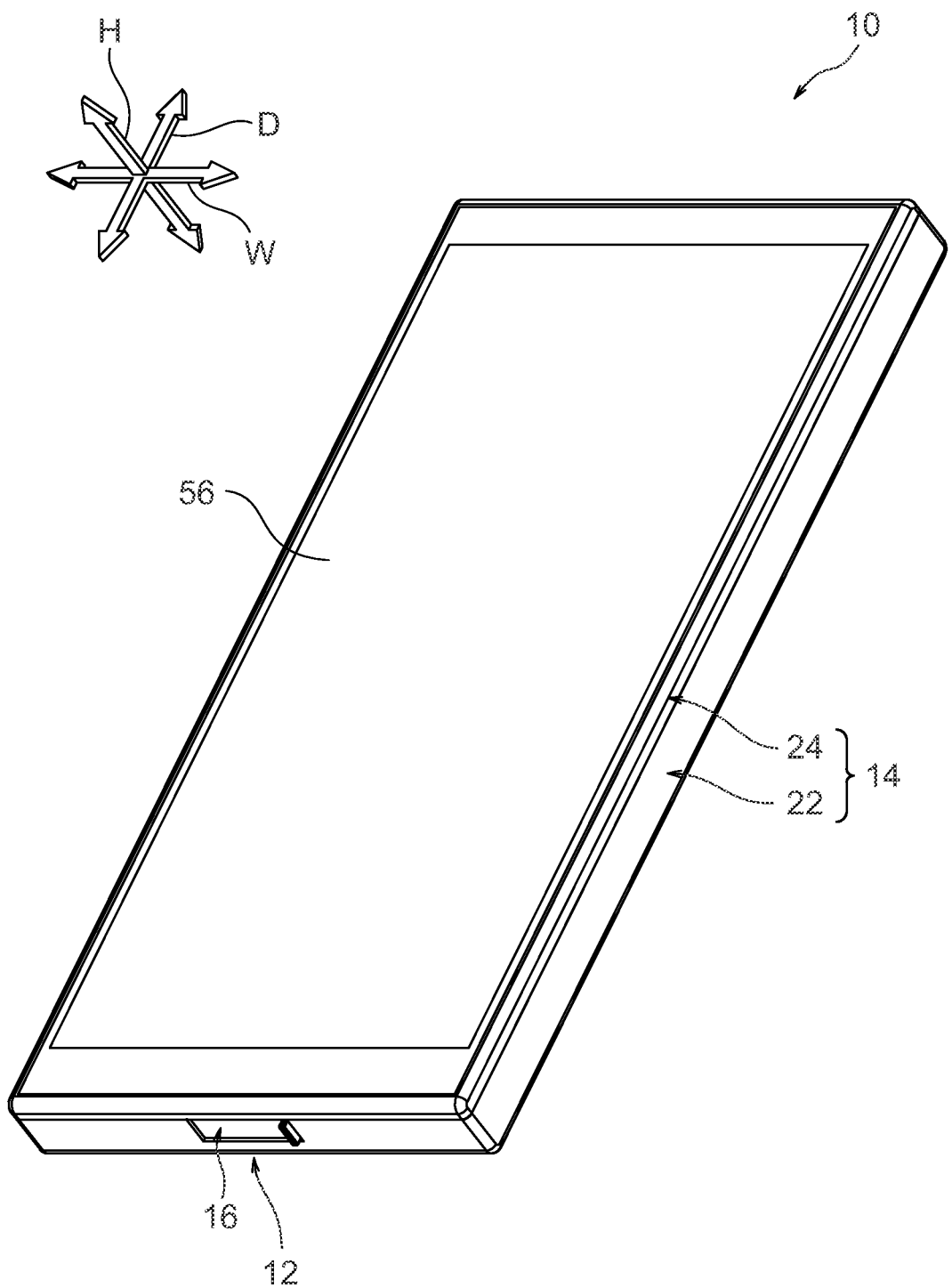
FIG. 1 is a perspective view of a smartphone of an exemplary embodiment.

FIG. 1 illustrates a smartphone 10 as an example of an electronic device. The smartphone 10 includes a lid opening-closing portion 12.

Lid Opening-Closing Portion

Figure 2:
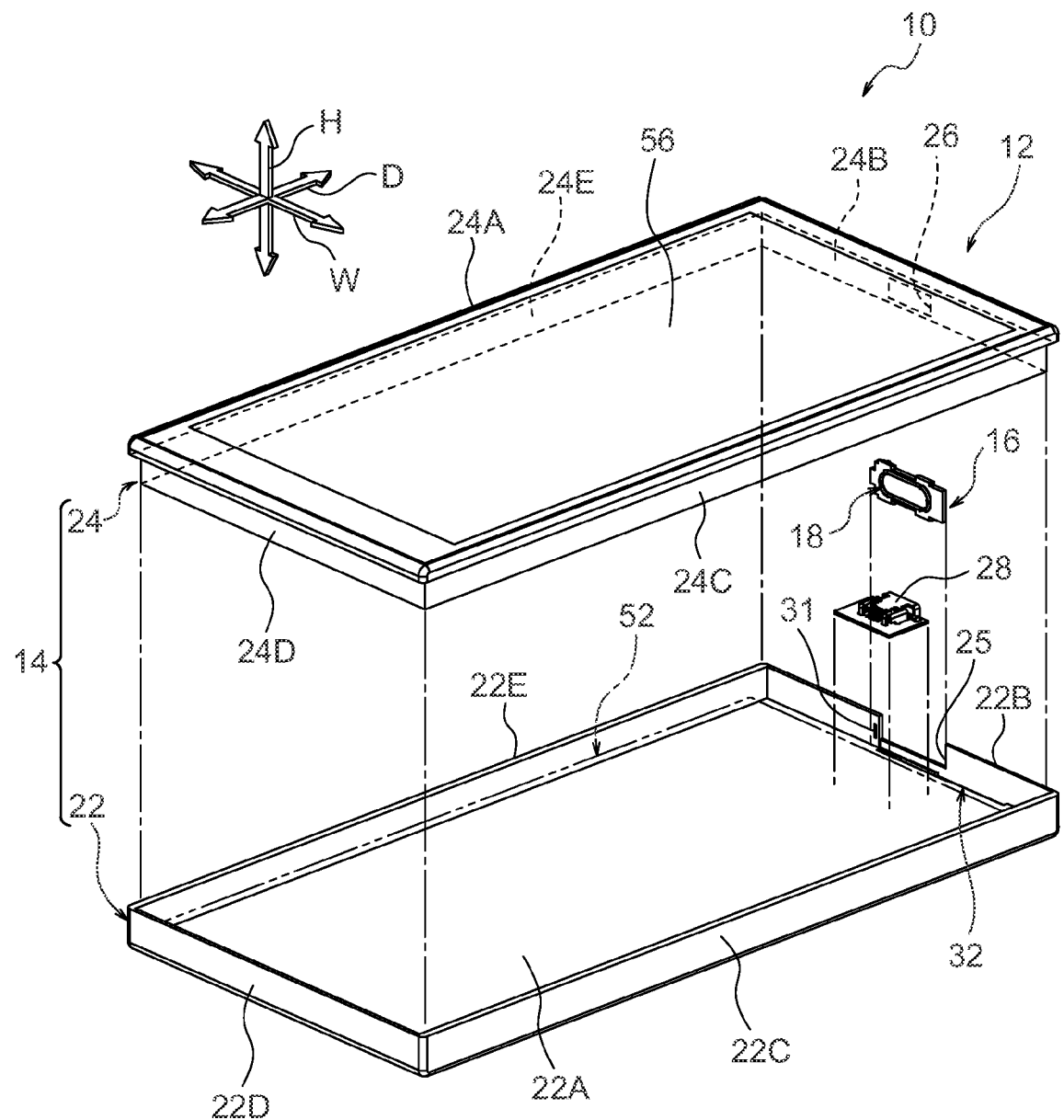
FIG. 2 is an exploded perspective view of a smartphone of an exemplary embodiment.

As illustrated in FIG. 2, the lid opening-closing portion 12 includes a case 14, a lid member 16, and packing 18. The lid member 16 is an example of a lid. The packing 18 is an example of a resilient member.

Case

As illustrated in FIG. 1 and FIG. 2, the case 14 is, as an example, formed in a flattened rectangular box shape. The case 14 includes a first case body 22 and a second case body 24. In the drawings, in a state in which the lid member 16 is disposed with its front face at the near side, the depth direction, width direction, and height direction of the case 14 are respectively indicated by arrow D, arrow W, and arrow H. The depth direction, width direction, and height direction are merely directions to facilitate explanation, and are not limitations to usage states of the smartphone 10.

In the following explanation, the depth direction, width direction, and height direction are referred to as the D direction, W direction, and H direction. The D direction, W direction, and H direction are orthogonal to (intersect with) each other. Reference is made to the near side and the far side in order to discriminate between one side and the other side in the D direction. Reference is made to the left side and the right side in order to discriminate between one side and the other side in the W direction. Reference is made to the upper side and the lower side in order to discriminate between one side and the other side in the H direction. The horizontal direction of the case 14 includes both the D direction and the W direction.

First Case Body

Figure 3:
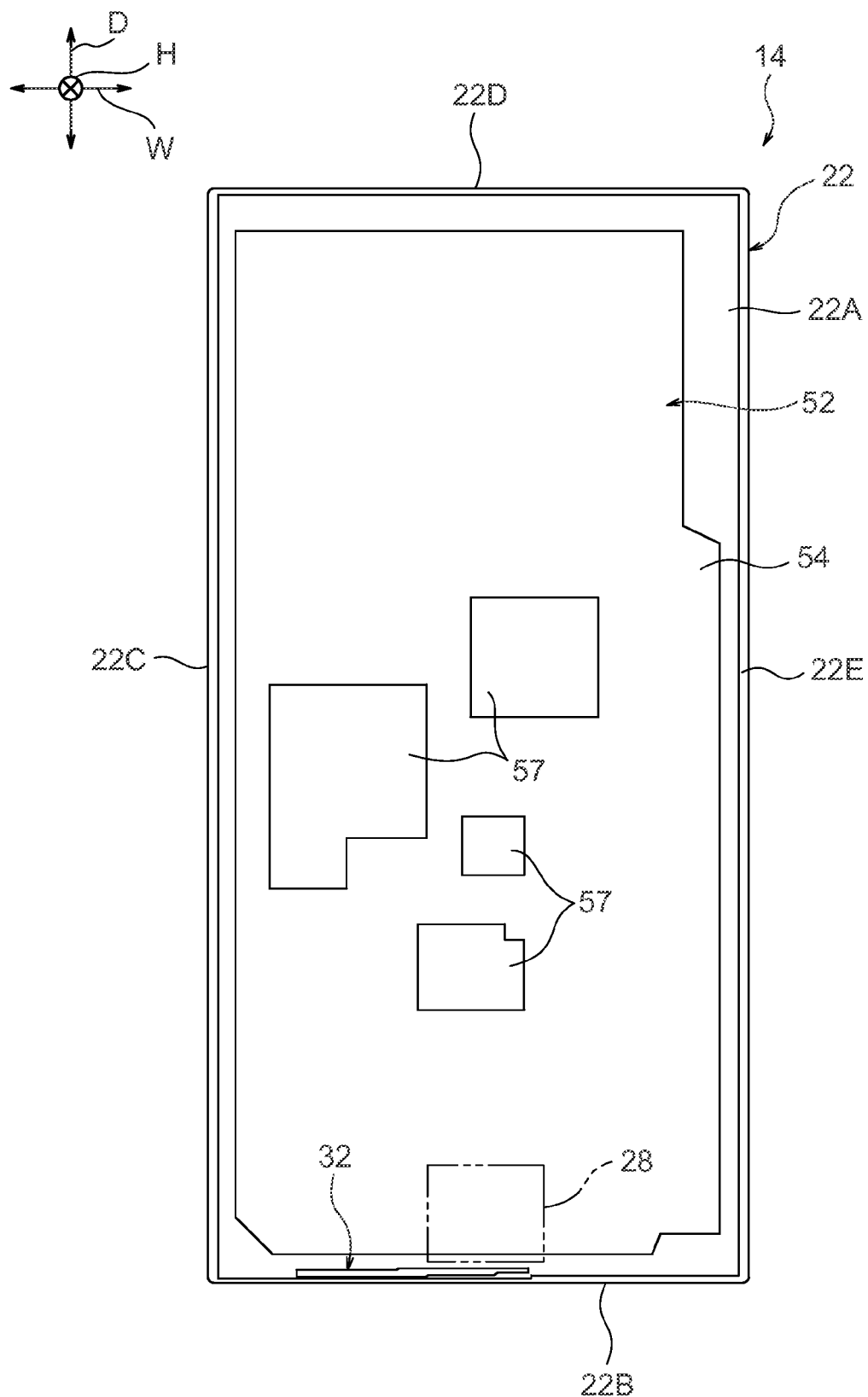
FIG. 3 is a plan view of an electronic unit of an exemplary embodiment.
Figure 4:
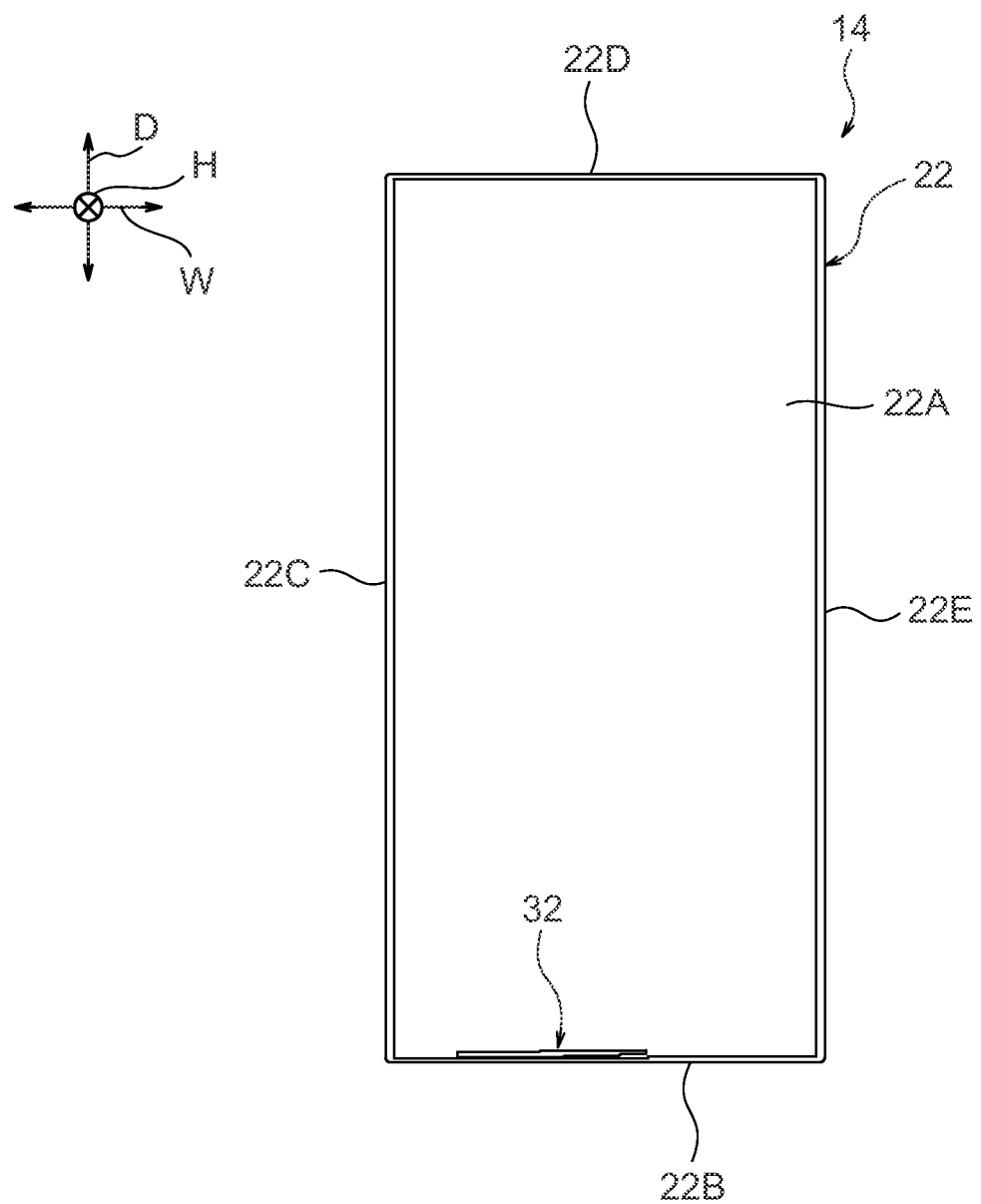
FIG. 4 is a plan view of a first case body of an exemplary embodiment.

As illustrated in FIG. 3 to FIG. 4, the first case body 22 is formed in a rectangular shape with the long direction along the D direction when viewing the case 14 from the H direction upper side. More specifically, the first case body 22 includes a rectangular shaped bottom plate 22A. The first case body 22 includes a plate shaped front wall 22B, left wall 22C, rear wall 22D, and right wall 22E that are upright along the H direction at peripheral edge portions of the bottom plate 22A. The front wall 22B is an example of a covering portion.

As illustrated in FIG. 3, an electronic unit 52 is housed inside the first case body 22. The electronic unit 52 includes a board 54 formed with a specific circuit pattern. Plural electronic components 57 are mounted to the board 54. A jack 28 (see FIG. 2) for a universal serial bus (USB) is, for example, electrically connected to some of the plural electronic components 57. The jack 28 is an example of a connection member. An end portion at the D direction near side of the jack 28 is disposed inside an opening 26 (see FIG. 2), described below.

As illustrated in FIG. 2, a cutout 25 is formed at a W direction central portion of the front wall 22B. The cutout 25 is a location cut out toward the bottom plate 22A, from the H direction top end to the center of the front wall 22B. The cutout 25 is cut out in a rectangular shape with a crosswise length as viewed along the D direction, piercing through in the D direction. A contact portion 31 is formed on the inner face of the front wall 22B, protruding toward the D direction far side at the W direction right side of the cutout 25. A first longitudinal groove 32 is also formed further to the inside than the front wall 22B at the H direction top face of the bottom plate 22A. The first longitudinal groove 32 is an example of a longitudinal groove. The first longitudinal groove 32 is indented toward the H direction lower side.

First Longitudinal Groove

Figure 5:
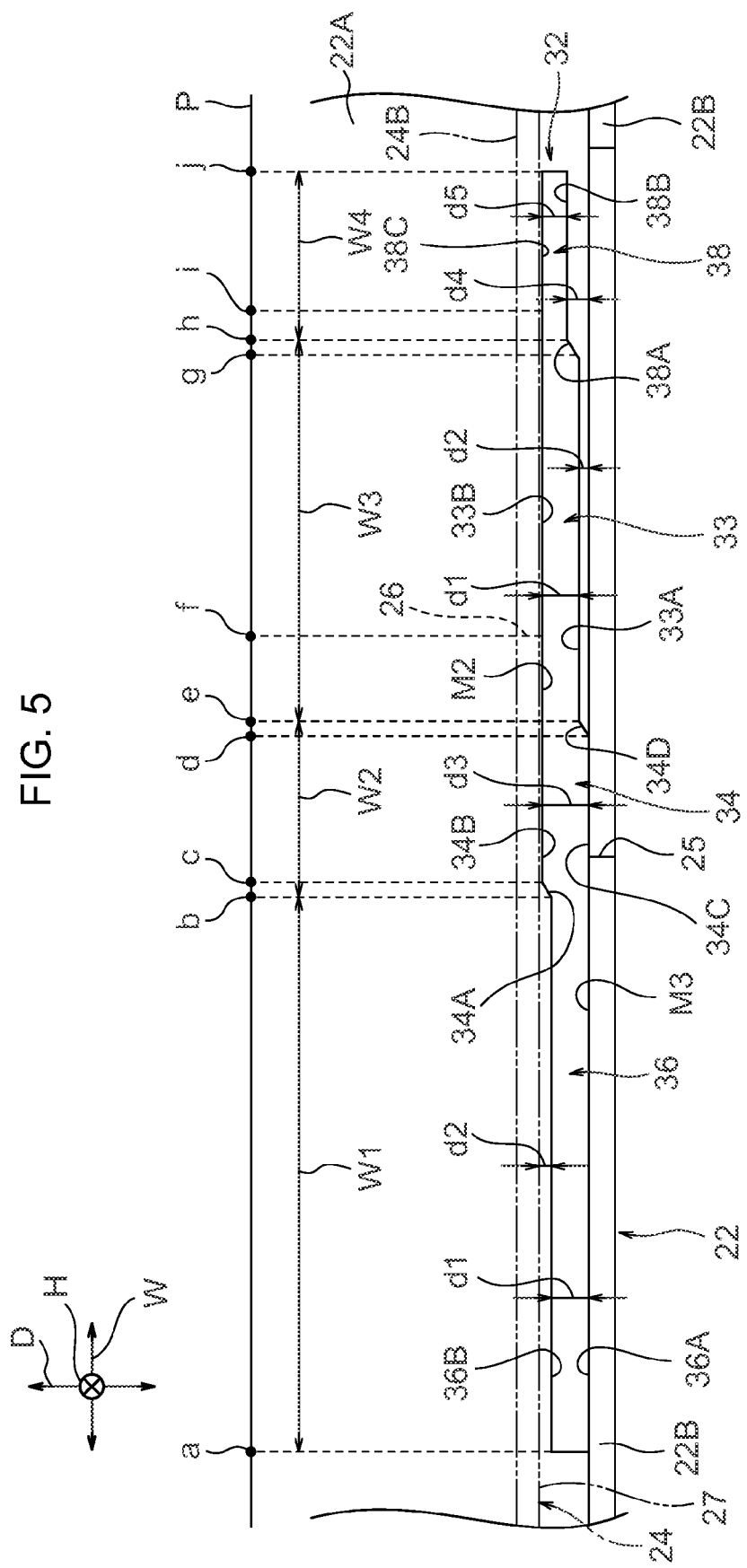
FIG. 5 is an enlarged view of a first longitudinal groove of an exemplary embodiment.

As illustrated in FIG. 5, the first longitudinal groove 32 includes a first groove portion 33, a wide width groove portion 34, a second groove portion 36, and a third groove portion 38. In the first longitudinal groove 32, the second groove portion 36, the wide width groove portion 34, the first groove portion 33, and the third groove portion 38 are formed in sequence along the W direction from the W direction left side toward the right side. The third groove portion 38 is formed at the terminal end portion of the first groove portion 33 and is included in the first groove portion 33.

The positions of the boundaries between each of the portions of the first longitudinal groove 32 and the opening 26, described below, are indicated by the positions a, b, c, d, e, f, g, h, i, j on a hypothetical line P running along the W direction. The positions a, b, c, d, e, f, g, h, i, j are disposed in sequence from the W direction left side to the right side when viewing the first longitudinal groove 32 from the H direction upper side. The H direction depth of the first longitudinal groove 32 is H1 (see FIG. 16). The length from the position a to the position b is W1, the length from the position b to the position e is W2, the length from the position e to the position h is W3, and the length from the position h to the position j is W4.

The second groove portion 36 is formed adjacent to the front wall 22B, extending in a straight line from the position a to the position b in the W direction. The position a is positioned further to the W direction right side than the left wall 22C (see FIG. 4). The second groove portion 36 includes a wall face 36A and a wall face 36B that are upright along the H direction and face each other in the D direction. The wall face 36A is formed along the W direction at the D direction near side. The wall face 36B is formed along the W direction at the D direction far side. A separation (groove width) in the D direction between the wall face 36A and the wall face 36B is length d1.

Figure 16:
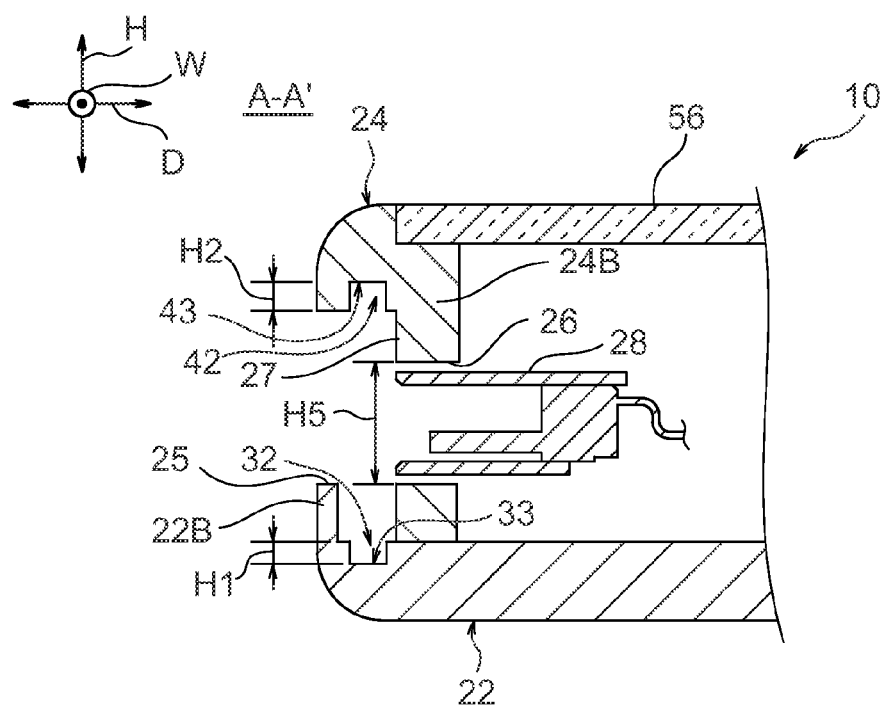
FIG. 16 is a partial vertical cross-section (a cross-section taken on line A-A' of FIG. 15) of a smartphone of an exemplary embodiment.

In an assembled state of the first case body 22 and the second case body 24, a front wall 24B of the second case body 24 is positioned further to the D direction far side (inside) than the first longitudinal groove 32 (see FIG. 16). Namely, in the assembled state of the first case body 22 and the second case body 24, the first longitudinal groove 32 is disposed between the front wall 22B and the front wall 24B as viewed along the H direction. The separation in the D direction between the wall face 36B and a side wall 27 on the D direction near side of the front wall 24B is, as an example, a length d2 (<d1).

As illustrated in FIG. 5, the wide width groove portion 34 is formed adjacent to the front wall 22B, and extends in the W direction from the position b to the position e. Namely, the left end of the wide width groove portion 34 is connected to the right end (terminal end) of the second groove portion 36. In the assembled state of the first case body 22 and the second case body 24, the wide width groove portion 34 is adjacent to the front wall 24B at the D direction near side. The wide width groove portion 34 includes an inclined groove wall 34A, a wall face 34B, a wall face 34C, and an inclined groove wall 34D. The inclined groove wall 34A, the wall face 34B, the wall face 34C, and the inclined groove wall 34D project out in the H direction.

The inclined groove wall 34A is formed as a connection portion to the second groove portion 36, and the inclined groove wall 34D is formed as a connection portion to the first groove portion 33. The inclined groove wall 34A and the inclined groove wall 34D are faces that guide a projection 65 and a projection 66 (see FIG. 13), described below, toward the opening 26.

The inclined groove wall 34A is inclined from the right end of the wall face 36B toward the W direction right side and toward the D direction far side. The wall face 34B is formed along the W direction, from the right end of the inclined groove wall 34A at the D direction far side (the front wall 24B side). The wall face 34C is formed along the W direction at the D direction near side from the right end of the wall face 36A. The inclined groove wall 34D is inclined from the right end of the wall face 34C toward the W direction right side and toward the D direction far side. The wall face 34B and the wall face 34C face each other along the D direction, and the separation (groove width) between the wall face 34B and the wall face 34C in the D direction is length d3 (>d1).

Namely, the wide width groove portion 34 is connected to the first groove portion 33 and the second groove portion 36 through the inclined groove wall 34A and the inclined groove wall 34D. The second groove portion 36, the wide width groove portion 34, the first groove portion 33, and the third groove portion 38 are contiguous to one another in the first longitudinal groove 32.

The inclined groove wall 34A is formed from the position b to the position c. The inclined groove wall 34D is formed from the position d to the position e. Namely, the inclined groove wall 34D is formed further to the W direction right side than the inclined groove wall 34A. The inclination angle of the inclined groove wall 34A with respect to the W direction is, as an example, the same as the inclination angle of the inclined groove wall 34D with respect to the W direction.

The first groove portion 33 is formed separated from the front wall 22B by a length d2 to the D direction far side, and extends along the W direction from the position e to the position h. The first groove portion 33 has a D direction groove width that reduces from length d1 to length d5 on progression from the position g to the position h. Note that since the first groove portion 33 includes the third groove portion 38, the first groove portion 33 corresponds to a portion of the first longitudinal groove 32 from position e to position j, however the current explanation distinguishes between from position e to position h, referred to as the first groove portion 33, and from position h to position j, referred to as the third groove portion 38.

The first groove portion 33 includes a wall face 33A and a wall face 33B that are upright along the H direction and face each other along the D direction. The wall face 33A is formed along the W direction at the D direction near side. The wall face 33B is formed along the W direction at the D direction far side. The separation in the D direction (groove width) between the wall face 33A and the wall face 33B is, as an example, length d1. The wall face 33B and the wall face 34B run along the W direction in the same plane (M2). The wall face 36A and the wall face 34C run along the W direction in the same plane (M3).

The third groove portion 38 extends in the W direction in a straight line from the position h to the position j, with a D direction groove width of length d5 (<d1). The third groove portion 38 is formed so as to be separated from the front wall 22B by a length d4 (>d2) to the D direction far side. The third groove portion 38 includes an inclined face 38A, a wall face 38B, and a wall face 38C that are upright along the H direction.

The inclined face 38A is an example of a first inclined face, and is formed as a connection portion between the first groove portion 33 and the third groove portion 38. The inclined face 38A is a face that guides the projection 66 (see FIG. 13), described below, toward the third groove portion 38. The inclined face 38A is inclined from the right end of the wall face 33A toward the W direction right side and toward the D direction far side. The inclined face 38A has an inclination angle with respect to the W direction that is, as an example, the same as those of the inclined groove wall 34A and the inclined groove wall 34D. The inclined face 38A, as an example, is disposed at a position where the projection 66 (see FIG. 13) makes contact with the inclined face 38A when the projection 65 (see FIG. 13) is in contact with the inclined groove wall 34D.

The wall face 38B is contiguous to the right end of the inclined face 38A and is formed along the W direction at the D direction near side. The wall face 38C is contiguous to the right end of the wall face 33B, and is formed along the W direction at the D direction far side. The wall face 38B and the wall face 38C face each other along the D direction.

Second Case Body

Figure 6:
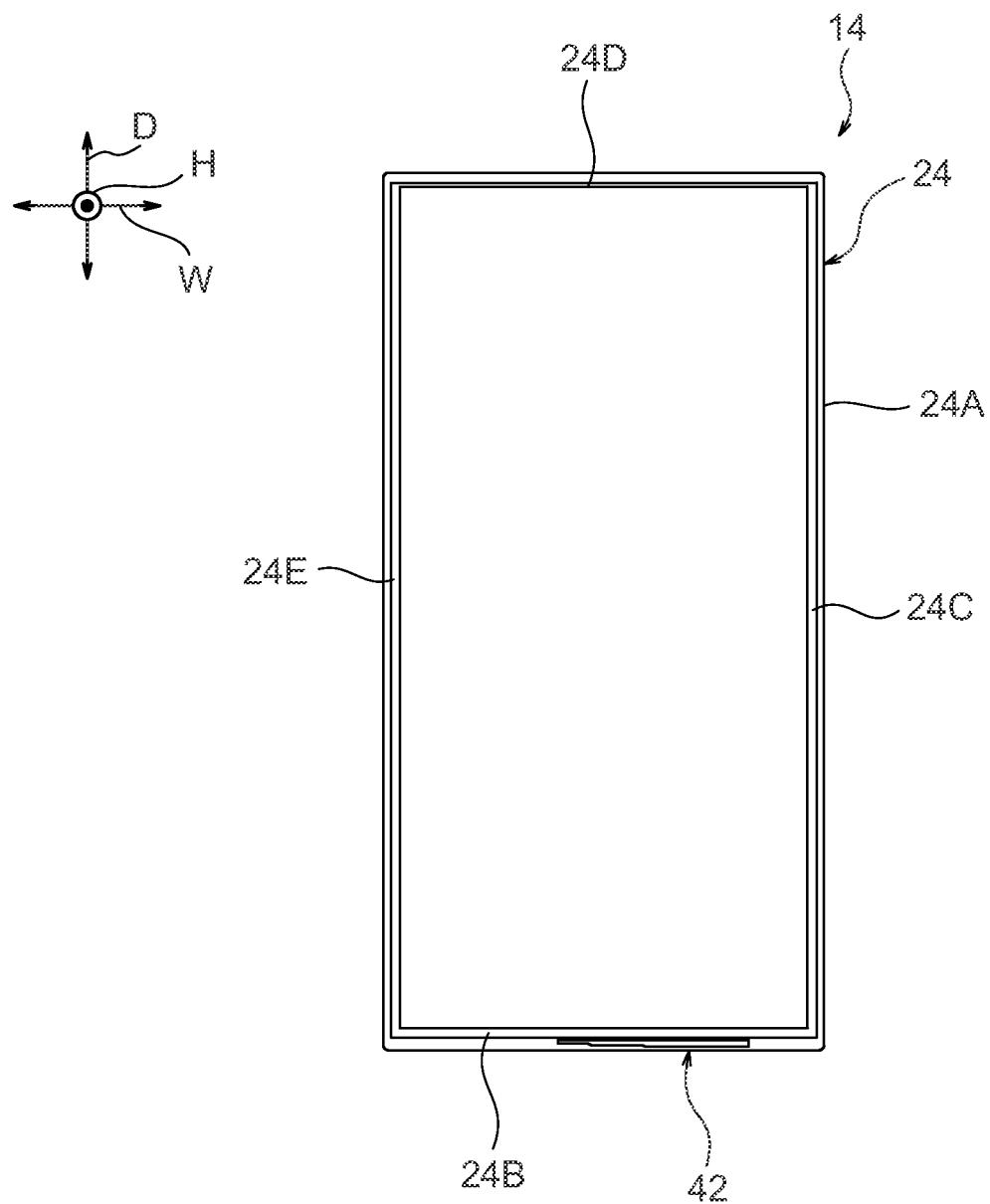
FIG. 6 is a bottom view of a second case body of an exemplary embodiment.

As illustrated in FIG. 6, the second case body 24 is formed in a rectangular shape with the long direction along the D direction, when viewing the second case body 24 from the H direction lower side. More specifically, the second case body 24 includes a frame 24A that has a rectangular shaped external profile. The second case body 24 also includes a plate shaped front wall 24B, left wall 24C, rear wall 24D, and right wall 24E that extend toward the H direction lower side from further to the inside than the peripheral edge of the frame 24A. The front wall 24B is an example of a wall portion. A second longitudinal groove 42 is formed at the H direction lower face of the frame 24A, further to the outside than the front wall 24B. The second longitudinal groove 42 is an example of a longitudinal groove, and is indented toward the H direction upper side.

As illustrated in FIG. 2, the opening 26 is formed to the front wall 24B. The opening 26 is positioned at the H direction and W direction center of the front wall 24B, and pierces through in the D direction. The opening 26 is formed in a rectangular shape with length running along the W direction as viewed along the D direction. The size of the opening 26 is a size such that the D direction near side end portion of the jack 28 is exposed to the D direction near side. A plug 29A (see FIG. 19) of a USB cable 29 (see FIG. 19) is connected to the jack 28.

A touch panel 56, also serving as a display for displaying information, is attached to an H direction upper portion of the second case body 24. The touch panel 56 is electrically connected to a circuit of the electronic unit 52 (see FIG. 3) through a cable, not illustrated in the drawings. A display for displaying information and an operation panel, or operation buttons, for operation input may be provided in place of the touch panel 56.

Second Longitudinal Groove

Figure 7:
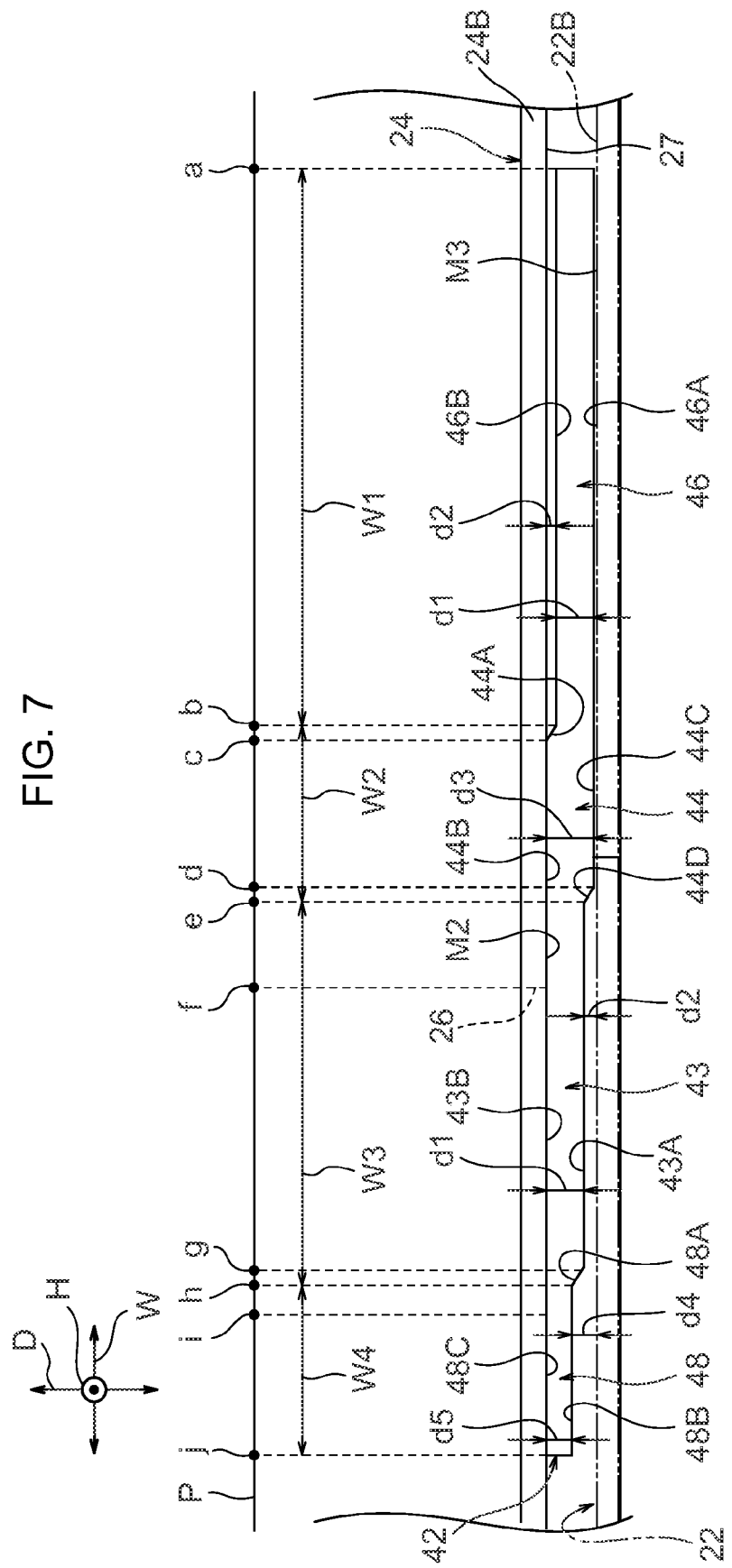
FIG. 7 is an enlarged view of a second longitudinal groove of an exemplary embodiment.

As illustrated in FIG. 7, the second longitudinal groove 42 includes a first groove portion 43, a wide width groove portion 44, a second groove portion 46, and a third groove portion 48. In the second longitudinal groove 42, the second groove portion 46, the wide width groove portion 44, the first groove portion 43, and the third groove portion 48 are formed in sequence along the W direction from the W direction left side toward the right side. The third groove portion 48 is formed at the terminal end portion of the first groove portion 43 and is included in the first groove portion 43.

The left and right of the second case body 24 illustrated in FIG. 7 are reversed to the actual left and right of the second case body 24 due to viewing the second case body 24 from the H direction lower side in FIG. 7. The near side and the far side of the second case body 24 illustrated in FIG. 7 are the same as the actual near side and far side of the second case body 24. The depth in the H direction of the second longitudinal groove 42 is H2 (see FIG. 16).

The second longitudinal groove 42 is formed further to the D direction near side (outside) than the front wall 24B. In an assembled state of the first case body 22 and the second case body 24, the second longitudinal groove 42 is positioned between the front wall 22B and the front wall 24B as viewed along the H direction. The second longitudinal groove 42 has the same shape and is the same size as the first longitudinal groove 32 (see FIG. 5) and is disposed facing toward the first longitudinal groove 32 in the H direction. The positions of respective portions of the second longitudinal groove 42 on the hypothetical line P are indicated by positions a, b, c, d, e, f, g, h, i, j.

The second groove portion 46 is formed at a position separated from the front wall 24B, adjacent to the front wall 22B. The second groove portion 46 extends in a straight line in the W direction from position a to position b. The second groove portion 46 includes a wall face 46A and a wall face 46B that are upright along the H direction and face each other along the D direction. The wall face 46A is formed running along the W direction at the D direction near side. The wall face 46B is formed running along the W direction at the D direction far side. The D direction separation (groove width) between the wall face 46A and the wall face 46B is length d1. The D direction separation between the wall face 46B and the front wall 24B is length d2.

The wide width groove portion 44 is formed adjacent to the front wall 24B, extending in the W direction from position b to position e. Namely, the left end of the wide width groove portion 44 is connected to the right end (terminal end) of the second groove portion 46. In an assembled state of the first case body 22 and the second case body 24, the wide width groove portion 44 is adjacent to the front wall 22B at the D direction far side. The wide width groove portion 44 includes an inclined groove wall 44A, a wall face 44B, a wall face 44C, and an inclined groove wall 44D.

The inclined groove wall 44A is formed as a connection portion to the second groove portion 46, and the inclined groove wall 44D is formed as a connection portion to the first groove portion 43. The inclined groove wall 44A and the inclined groove wall 44D are faces that guide a projection 63 and a projection 64 (see FIG. 12), described below, toward the opening 26 (see FIG. 2). The inclined groove wall 44A, the wall face 44B, the wall face 44C, and the inclined groove wall 44D project out in the H direction.

The inclined groove wall 44A is inclined from the right end of the wall face 46B toward the W direction right side and the D direction far side. The wall face 44B is formed at the D direction far side so as to run along the W direction from the right end of the inclined groove wall 44A. The wall face 44C is formed at the D direction near side so as to run along the W direction from the right end of the wall face 46A. The inclined groove wall 44D is inclined from the right end of the wall face 44C toward the W direction right side and toward the D direction far side. The wall face 44B and the wall face 44C face each other along the D direction, and the D direction separation (groove width) between the wall face 44B and the wall face 44C is length d3 (>d1).

Namely, the first groove portion 43 and the second groove portion 46 are connected together in the wide width groove portion 44 through the inclined groove wall 44A and the inclined groove wall 44D. The second groove portion 46, the wide width groove portion 44, the first groove portion 43, and the third groove portion 48 are contiguous to one another in the second longitudinal groove 42.

The inclined groove wall 44A is formed from position b to position c. The inclined groove wall 44D is formed from position d to position e. Namely, the inclined groove wall 44D is formed further to the W direction right side than the inclined groove wall 44A. The inclination angle with respect to the W direction of the inclined groove wall 44A is, as an example, the same as the inclination angle with respect to the W direction of the inclined groove wall 44D.

The first groove portion 43 is formed separated from the front wall 22B to the D direction far side by length d2, and extending in the W direction from position e to position h. Moreover, the first groove portion 43 has a groove width in the D direction that decreases from length d1 to length d5 on progression from position g to position h. Note that since the first groove portion 43 includes the third groove portion 48, the first groove portion 43 corresponds to a portion of the second longitudinal groove 42 from position e to position j, however the current explanation distinguishes between from position e to position h, referred to as the first groove portion 43, and from position h to position j, referred to as the third groove portion 48.

The first groove portion 43 includes a wall face 43A and a wall face 43B that are upright along the H direction and face each other along the D direction. The wall face 43A is formed running along the W direction at the D direction near side. The wall face 43B is formed running along the W direction at the D direction far side. The D direction separation (groove width) between the wall face 43A and the wall face 43B is, as an example, length d1. The wall face 43B and the wall face 44B extend along the W direction in the same plane (M2). The wall face 46A and the wall face 44C extend along the W direction in the same plane (M3).

The third groove portion 48 extends in the W direction from position h to position j, in a straight line with a D direction groove width of length d5. The third groove portion 48 is formed separated from the front wall 22B by length d4 to the D direction far side. The third groove portion 48 also includes an inclined face 48A, a wall face 48B, and a wall face 48C that are upright along the H direction.

The inclined face 48A is an example of a first inclined face, and is formed as a connection portion between the first groove portion 43 and the third groove portion 48. The inclined face 48A is a face that guides the projection 64 (see FIG. 12), described below, toward the third groove portion 48. The inclined face 48A is inclined from the right end of the wall face 43A toward the W direction right side and toward the D direction far side. The inclination angle with respect to the W direction of the inclined face 48A is, as an example, the same as those of the inclined groove wall 44A and the inclined groove wall 44D. The inclined face 48A, as an example, is disposed at a position where the projection 64 (see FIG. 12) makes contact with the inclined face 48A when the projection 63 (see FIG. 12) is in contact with the inclined groove wall 44D.

The wall face 48B is contiguous to the right end of the inclined face 48A and is formed along the W direction at the D direction near side. The wall face 48C is contiguous to the right end of the wall face 43B, and is formed along the W direction at the D direction far side. The wall face 48B and the wall face 48C face each other along the D direction.

As illustrated in FIG. 16, the first longitudinal groove 32 and the second longitudinal groove 42 extend in the W direction along the side wall 27 at the D direction near side of the front wall 24B, side-by-side in the H direction. More specifically, the first groove portion 33 and the first groove portion 43 extend in the W direction along the side wall 27, side-by-side in the H direction, with the opening 26 therebetween.

In FIG. 5 and FIG. 7, the second groove portion 36 and the second groove portion 46 extend, at positions separated from the opening 26, in the W direction along the side wall 27, side-by-side in the H direction. The wide width groove portion 34 faces the wide width groove portion 44 along the H direction. The third groove portion 38 faces the third groove portion 48 along the H direction. The length from the terminal end (position e) of the wide width groove portion 34 to the terminal end (position j) of the third groove portion 38 is the same as the length from the terminal end (position e) of the wide width groove portion 44 to the terminal end (position j) of the third groove portion 48, (W3+W4). The length (W3+

W4) is, as an example, the same as the length W1 (see FIG. 12) of the lid member 16, described below.

Lid Member

Explanation next follows regarding the lid member 16.

As illustrated in FIG. 8, FIG. 9, FIG. 10, and FIG. 11, the lid member 16, as an example, includes a body 62. The body 62 is formed with the projection 63, the projection 64, the projection 65, and the projection 66 that protrude out in the H direction, a protrusion 67 that protrudes in the W direction, and a grip 69 that protrudes in the D direction. The projection 63, the projection 64, the projection 65, and the projection 66, are examples of plate tabs having a thickness direction in the D direction.

Body

Figure 8:
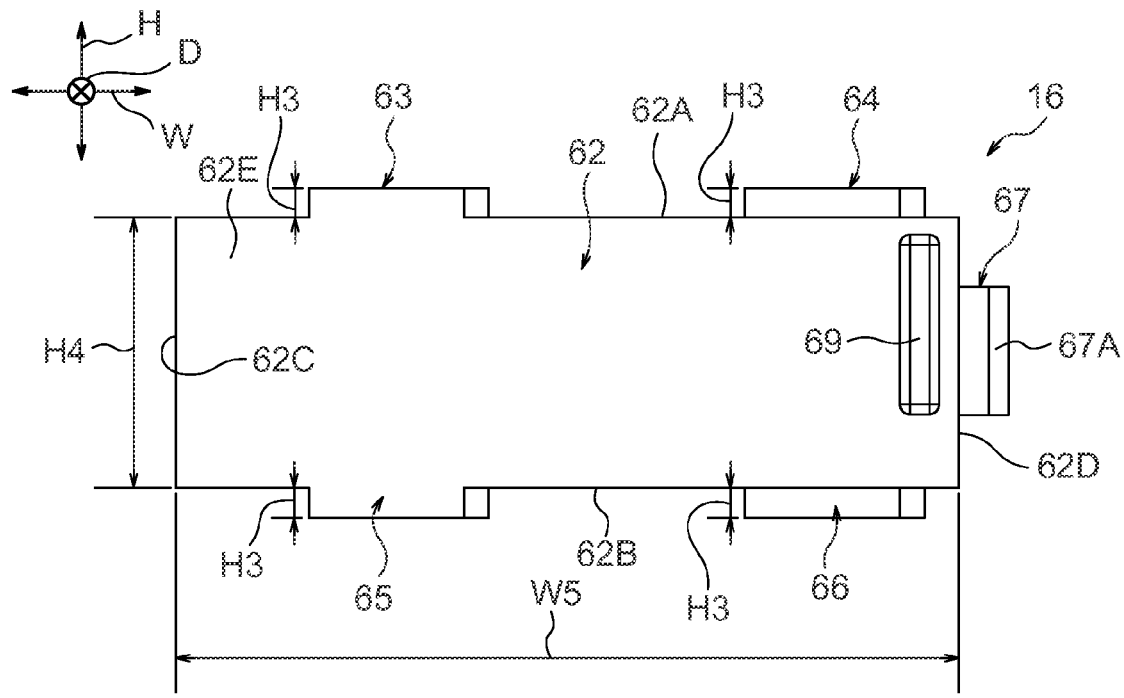
FIG. 8 is a face-on view of a lid member of an exemplary embodiment.

As illustrated in FIG. 8, the body 62 is formed in a rectangular shape with the long direction in the W direction, the short direction in the H direction, and is formed in a plate shape with a thickness direction in the D direction. The body 62, as viewed along the D direction from the side formed with the grip 69, includes an upper face 62A, a lower face 62B, a left side face 62C, a right side face 62D, a front face 62E, and a back face 62F (see FIG. 9). The body 62 has a W direction length of W5, a D direction thickness of d7 (see FIG. 10), and a H direction height of H4.

Figure 15:
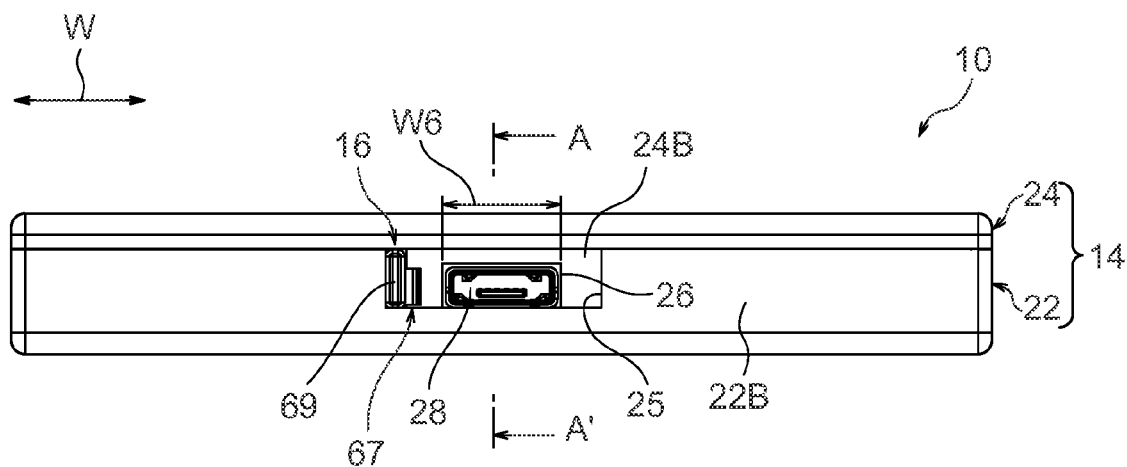
FIG. 15 is a face-on view of a smartphone of an exemplary embodiment.

The length W5 is longer than the W direction length W6 (see FIG. 15) of the opening 26 (see FIG. 15). Moreover, in a closed state in which the opening 26 is closed by the lid member 16, the length W5 is a length such that the lid member 16 covers the wide width groove portion 34 (see FIG. 5) and the wide width groove portion 44 (see FIG. 7) in the H direction. The height H4 is higher than the H direction height H5 (see FIG. 16) of the opening 26.

Projections

The projection 63 protrudes to the H direction upper side from the upper face 62A at a position further to the left side than the W direction center. The projection 64 protrudes to the H direction upper side from the upper face 62A at a position further to the right side than the W direction center. Namely, the projection 63 and the projection 64 are disposed separated from each other in the W direction. The projection 63 is an example of a projection and of a first projection. The projection 64 is an example of a projection and of a second projection.

The projection 65 protrudes to the H direction lower side from the lower face 62B at a position further to the left side than the W direction center. The projection 66 protrudes to the H direction lower side from the lower face 62B at a position further to the right side than the W direction center. Namely, the projection 65 and the projection 66 are disposed separated from each other in the W direction. The projection 65 is an example of a projection and of a first projection. The projection 66 is an example of a projection and of a second projection.

The projection 63 and the projection 64 have, as an example, a projection length from the upper face 62A of H3. The projection 65 and the projection 66 have, as an example, a projection length from the lower face 62B of H3. The length H3 is longer than the depth H1 of the first longitudinal groove 32 (see FIG. 16) and the depth H2 of the second longitudinal groove 42 (see FIG. 16).

Figure 12:
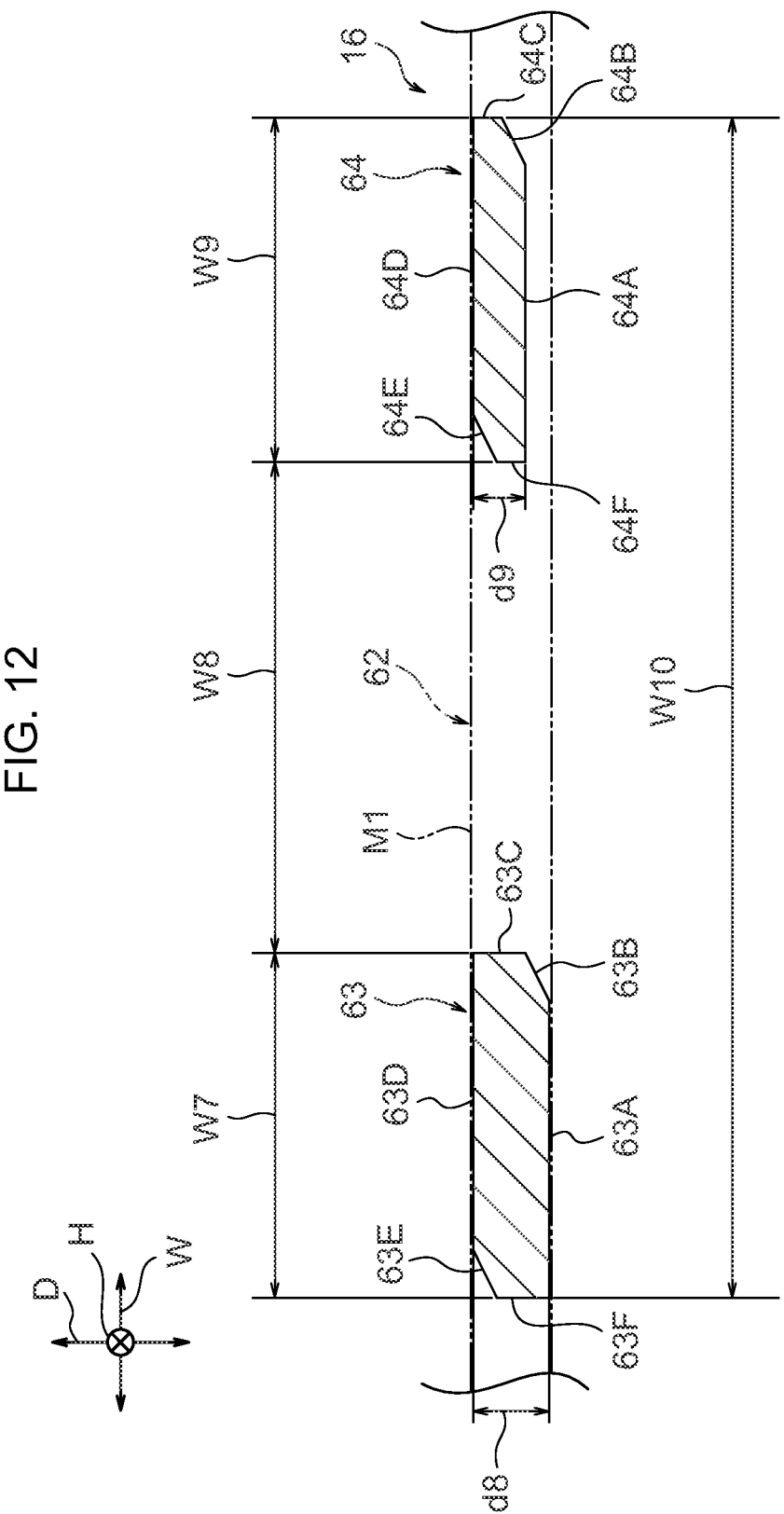
FIG. 12 is an explanatory diagram of projections of an exemplary embodiment.

As illustrated in FIG. 12, the projection 63 has, as an example, an external profile as viewed along the H direction in which one pair of diagonally opposite corners of a rectangular shape are cut at an angle. The projection 63 includes a front face 63A, an inclined face 63B, a right side face 63C, a rear face 63D, an inclined face 63E, and a left side face 63F. The front face 63A is disposed at the D direction near side, and the rear face 63D is disposed at the D direction far side. The D direction far side is the side of the front wall 24B (see FIG. 2). The D direction thickness from the front face 63A to the rear face 63D is d8. The thickness d8 is, as an example, thinner than the thickness d7 of the body 62.

The inclined face 63B has, as an example, an inclination angle with respect to the W direction the same as that of the inclined groove wall 44D of the second longitudinal groove 42 (see FIG. 7). The inclined face 63E has, as an example, an inclination angle with respect to the W direction that is the same as that of the inclined groove wall 44A of the second longitudinal groove 42 (see FIG. 7). The inclined face 63B and the inclined face 63E are an example of second inclined faces.

The projection 64 has, as an example, an external profile as viewed along the H direction in which one pair of diagonally opposite corners of a rectangular shape are cut at an angle. The projection 64 includes a front face 64A, an inclined face 64B, a right side face 64C, a rear face 64D, an inclined face 64E, and a left side face 64F. The front face 64A is disposed at the D direction near side, and the rear face 64D is disposed at the D direction far side. The D direction thickness from the front face 64A to the rear face 64D is d9. The thickness d9 is thinner than the thickness d8 of the projection 63.

The inclined face 64B has, as an example, an inclination angle with respect to the W direction the same as that of the inclined groove wall 44D and the inclined face 48A of the second longitudinal groove 42 (see FIG. 7). The inclined face 64E has, as an example, an inclination angle with respect to the W direction that is the same as that of the inclined groove wall 44A of the second longitudinal groove 42 (see FIG. 7). The inclined face 64B and the inclined face 64E are an example of second inclined faces.

The rear face 64D and the rear face 63D, as an example, are disposed in the same plane along the W direction (M1). The front face 64A is disposed further to the D direction far side than the front face 63A. The length of the displacement between the front face 63A and the front face 64A in the D direction is (d8-d9). As an example, the displacement length (d8-d9) is the same as the length d2 (see FIG. 7). The W direction length of the projection 63 is W7. The W direction length of the projection 64 is W9. The separation in the W direction between the projection 63 and the projection 64 is W8. Namely, a length W10 from the left side face 63F that is the outer end of the projection 63 to the right side face 64C that is the outer end of the projection 64 is a length (W7+W8+W9).

The length W8 is, as an example, shorter than the W direction length W6 of the opening 26 (see FIG. 15). The opening 26 is formed in a section from position f to position i. Accordingly, when the lid member 16 is in a closed state closing the opening 26, the projection 63 and the projection 65 (see FIG. 13) are disposed at the W direction left side of the opening 26, and the projection 64 and the projection 66 (see FIG. 13) are disposed at the W direction right side of the opening 26. The length W10 is, as an example, the same as the W direction length (W3+W4) of the first groove portion 43 and the third groove portion 48 (see FIG. 7). The length W9 is, as an example, the same as the length W7 and the length W4 (see FIG. 7).

Figure 13:
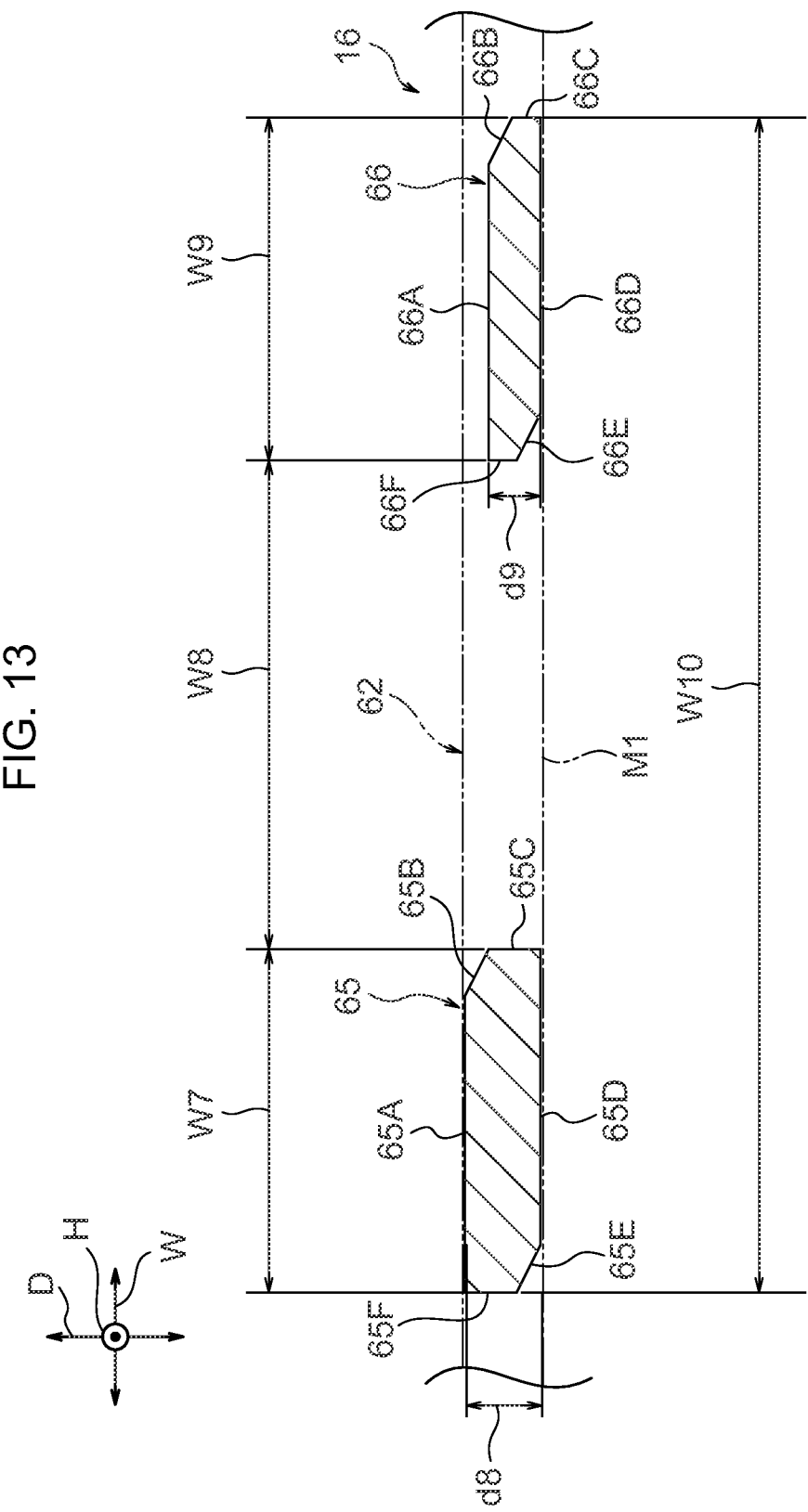
FIG. 13 is an explanatory diagram of projections of an exemplary embodiment.

As illustrated in FIG. 13, the projection 65 has, as an example, an external profile as viewed along the H direction in which one pair of diagonally opposite corners of a rectangular shape are cut at an angle. The projection 65 includes a front face 65A, an inclined face 65B, a right side face 65C, a rear face 65D, an inclined face 65E, and a left side face 65F. The front face 65A is disposed at the D direction near side, and the rear face 65D is disposed at the D direction far side. The D direction thickness from the front face 65A to the rear face 65D is d8, the same as that of the projection 63 (see FIG. 12).

The inclined face 65B has, as an example, an inclination angle with respect to the W direction the same as that of the inclined groove wall 34D of the first longitudinal groove 32 (see FIG. 5). The inclined face 65E has, as an example, an inclination angle with respect to the W direction that is the same as that of the inclined groove wall 34A of the first longitudinal groove 32 (see FIG. 5). The inclined face 65B and the inclined face 65E are an example of second inclined faces.

The projection 66 has, as an example, an external profile as viewed along the H direction in which one pair of diagonally opposite corners of a rectangular shape are cut at an angle. The projection 66 includes a front face 66A, an inclined face 66B, a right side face 66C, a rear face 66D, an inclined face 66E, and a left side face 66F. The front face 66A is disposed at the D direction near side, and the rear face 66D is disposed at the D direction far side. The D direction thickness from the front face 66A to the rear face 66D is d9, the same as that of the projection 64 (see FIG. 12).

The inclined face 66B has, as an example, an inclination angle with respect to the W direction the same as that of the inclined groove wall 34D and the inclined face 38A of the first longitudinal groove 32 (see FIG. 5). The inclined face 66E has, as an example, an inclination angle with respect to the W direction that is the same as that of the inclined groove wall 34A of the first longitudinal groove 32 (see FIG. 5). The inclined face 66B and the inclined face 66E are an example of second inclined faces.

The rear face 66D and the rear face 65D, as an example, are disposed in the same plane along the W direction (M1). The front face 66A is disposed further to the D direction far side than the front face 65A. The length of the displacement between the front face 65A and the front face 66A in the D direction is (d8-d9). As already stated, the displacement length (d8-d9) is the same as the length d2 (see FIG. 5). The W direction length of the projection 65 is W7, the same as that of the projection 63 (see FIG. 12). The W direction length of the projection 66 is W9, the same as that of the projection 64 (see FIG. 12). Moreover, the separation in the W direction between the projection 65 and the projection 66 is W8, the same as the separation in the W direction between the projection 63 and the projection 64. Namely, a length from the left side face 65F that is the outer end of the projection 65 to the right side face 66C that is the outer end of the projection 66 is the length W10.

Protrusions

Figure 10:
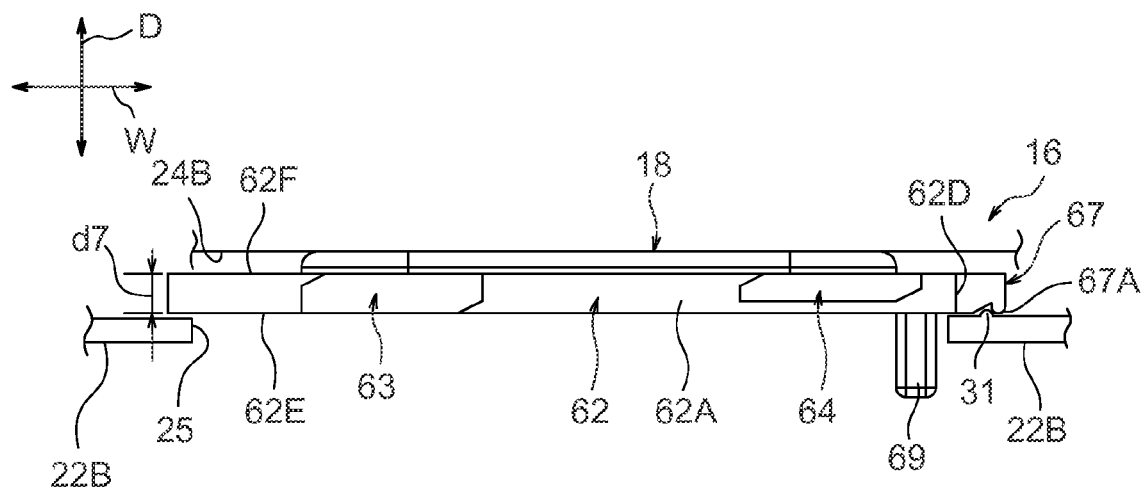
FIG. 10 is a plan view of a lid member of an exemplary embodiment.
Figure 11:
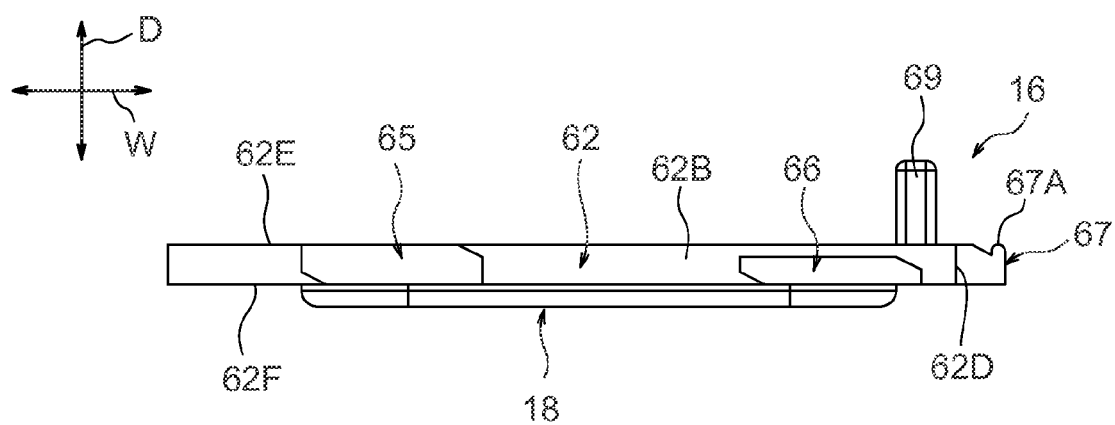
FIG. 11 is a bottom view of a lid member of an exemplary embodiment.

As illustrated in FIG. 10 and FIG. 11, the protrusion 67 protrudes from the right side face 62D of the body 62 toward the W direction right side. The W direction is an example of an intersecting direction. As an example, a contacted portion 67A is formed on the W direction right end of the protrusion 67. The contacted portion 67A is a location that protrudes toward the D direction near side. The D direction thickness of the protrusion 67 becomes thinner on progression from the right side face 62D toward the contacted portion 67A. The contacted portion 67A is accordingly suppressed from protruding out further to the D direction near side than the front face 62E of the body 62.

As illustrated in FIG. 10, in a closed state in which the opening 26 (see FIG. 2) is closed by the lid member 16, the contacted portion 67A contacts the contact portion 31 of the front wall 22B. Moreover, the contacted portion 67A has a size and external profile that overrides the contact portion 31 as the lid member 16 moves in the W direction.

Grip

As illustrated in FIG. 10, the grip 69 protrudes toward the D direction near side at a position adjacent to the W direction right side of the body 62. The grip 69 passes through the cutout 25, and protrudes further to the near side than the front wall 22B. The grip 69 is manipulated by an operator.

The projection 63 and the projection 64 illustrated in FIG. 10 are inserted into the second longitudinal groove 42 illustrated in FIG. 7, and move in the W direction inside the second longitudinal groove 42. The projection 63 engages with the first groove portion 43 and the second groove portion 46. The projection 64 engages with the third groove portion 48. The projection 65 and the projection 66 illustrated in FIG. 11 are inserted into the first longitudinal groove 32 illustrated in FIG. 5, and move in the W direction inside the first longitudinal groove 32. The projection 65 engages with the first groove portion 33 and the second groove portion 36. The projection 66 engages with the third groove portion 38.

Packing

Explanation next follows regarding the packing 18.

Figure 9:
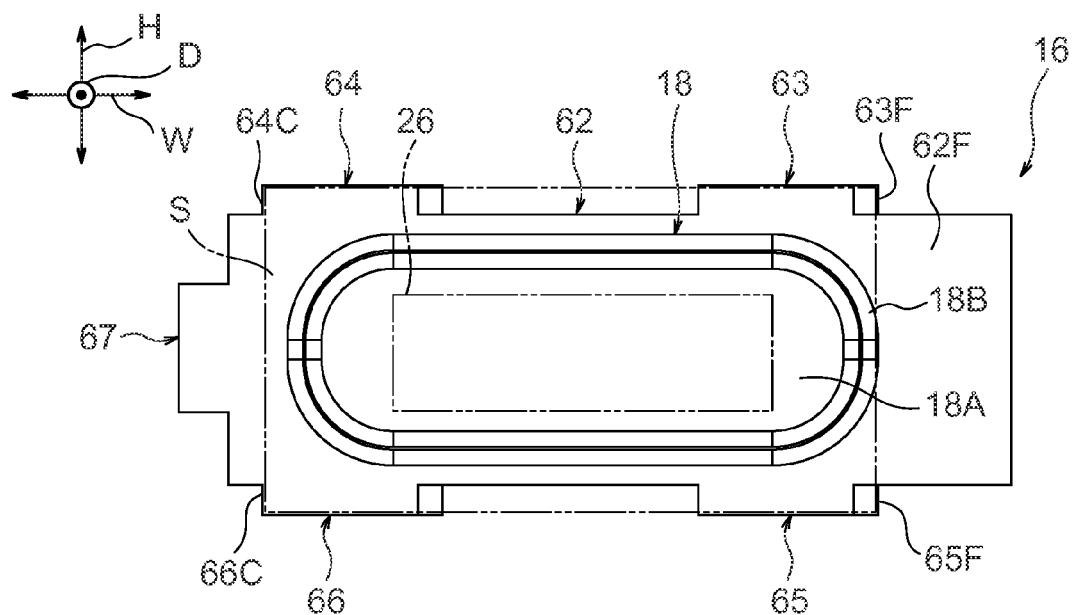
FIG. 9 is a back view of a lid member of an exemplary embodiment.

The packing 18 illustrated in FIG. 9 is, as an example, formed by a silicone rubber. The packing 18 includes a fixed portion 18A that is fixed to the back face 62F of the body 62, and a peripheral edge portion 18B formed around the peripheral edge of the fixed portion 18A. The fixed portion 18A and the peripheral edge portion 18B are integrated together. The fixed portion 18A is, as an example, fixed to the body 62 by two-color molding. The method of fixing the fixed portion 18A to the body 62 may be fixing by integrally molding, or may be fixing by adhesive.

The peripheral edge portion 18B protrudes toward the front wall 24B (see FIG. 10), further to the D direction far side than the fixed portion 18A. The D direction projection length of the peripheral edge portion 18B is a length so as to be nipped and compressed between the lid member 16 and the front wall 24B when the lid member 16 is disposed in a closed state, described below. In a closed state in which the lid member 16 is in a closed position, the peripheral edge portion 18B forms a closed curve shape so as to surround the opening 26 (illustrated by the double-dashed lines).

Moreover, the packing 18, as an example, is disposed inside a region S (illustrated by double dashed lines) corresponding to a region from the W direction outer ends of the projection 63 and the projection 65, to the W direction outer ends of the projection 64 and the projection 66. The outer end of the projection 63 is the left side face 63F, the outer end of the projection 65 is the left side face 65F, the outer end of the projection 64 is the right side face 64C, and the outer end of the projection 66 is the right side face 66C.

Explanation next follows regarding operation and advantageous effects of the present exemplary embodiment.

The first longitudinal groove 32 (see FIG. 5) and the second longitudinal groove 42 (see FIG. 7) have the same shape and the same size as each other. The projection 63 (see FIG. 12) and the projection 65 (see FIG. 13) also have the same shape and the same size as each other, and the projection 64 (see FIG. 12) and the projection 66 (see FIG. 13) also have the same shape and the same size as each other. Movement of the projection 65 and the projection 66 (see FIG. 13) in the first longitudinal groove 32 (see FIG. 5) is the same as the movement of the projection 63 and the projection 64 (see FIG. 12) in the second longitudinal groove 42 (see FIG. 7). Consequently, explanation follows regarding movement of the projection 65 and the projection 66 in the first longitudinal groove 32, and explanation regarding the movement of the projection 63 and the projection 64 in the second longitudinal groove 42 is omitted.

Opening the Opening

Figure 14:
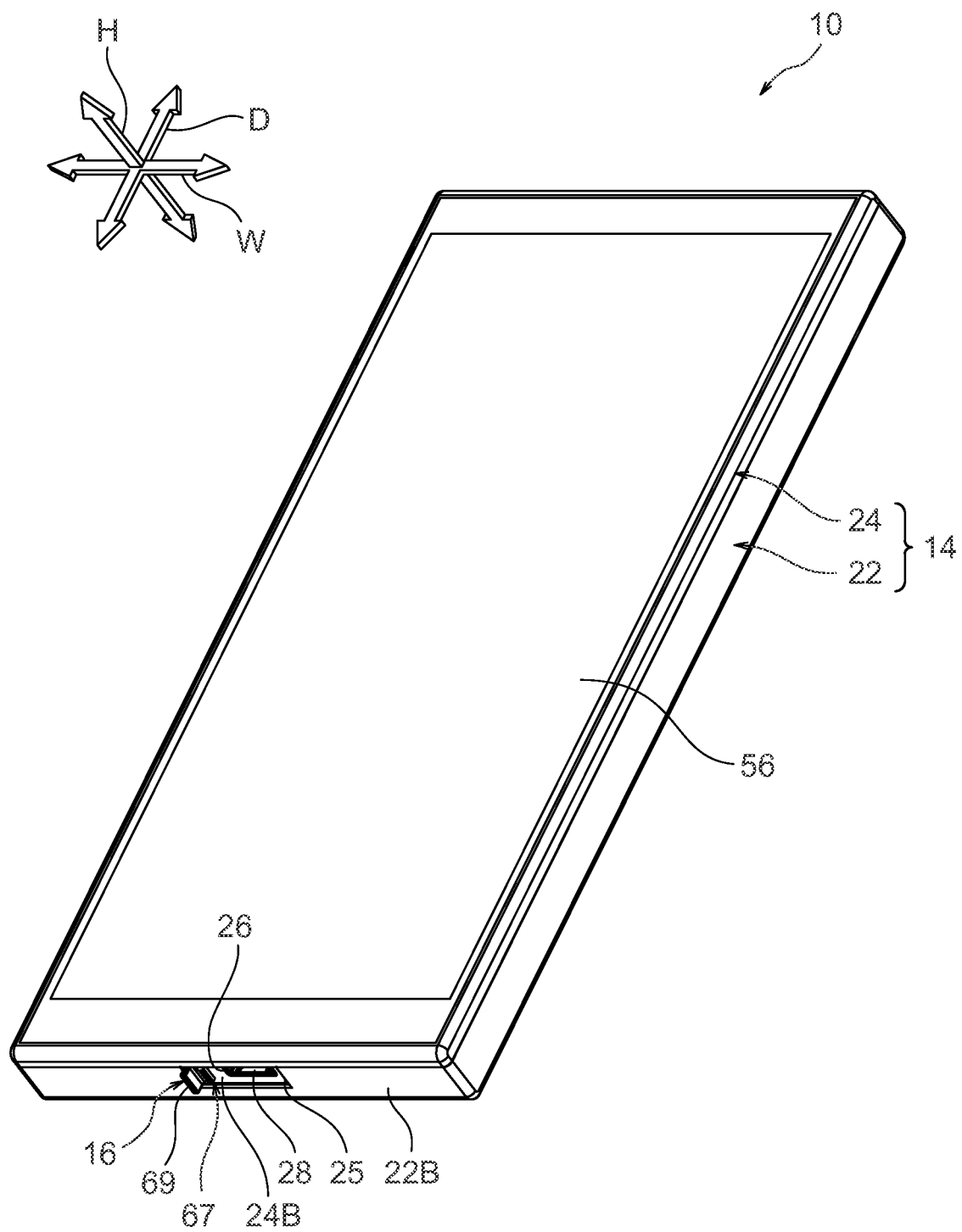
FIG. 14 is a perspective view of a smartphone of an exemplary embodiment.

As illustrated in FIG. 14 and FIG. 15, the open position of the lid member 16 is one in which the lid member 16 is disposed at the W direction left side with respect to the opening 26, and the grip 69 is positioned in contact with the face on the W direction left side of the cutout 25. In the open state in which the lid member 16 is disposed in the open position, the opening 26 is open and the jack 28 is exposed to the D direction near side.

Figure 20:
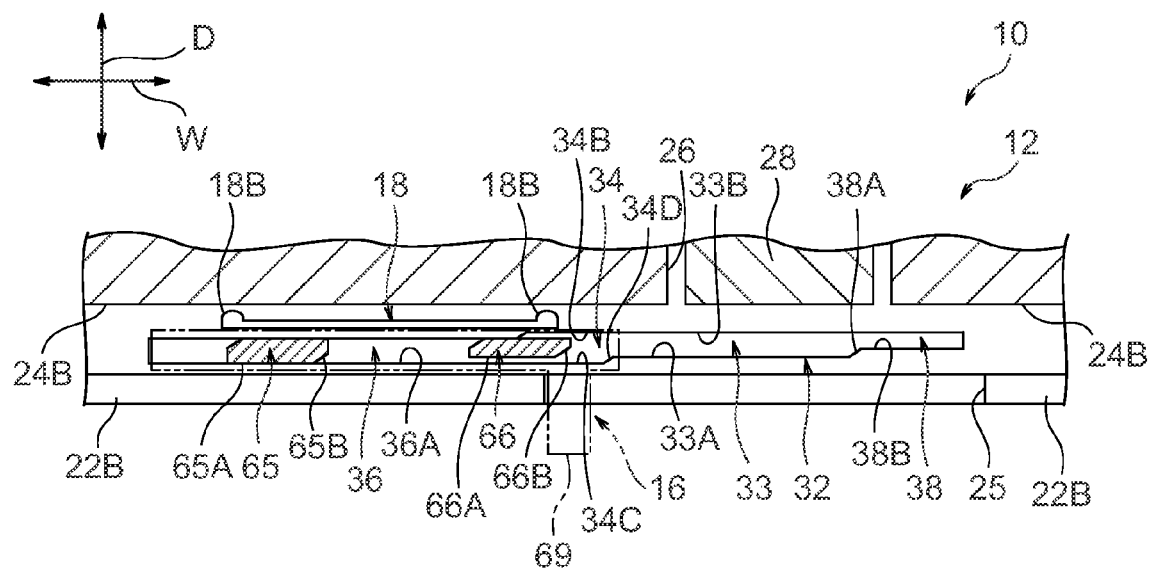
FIG. 20 is an explanatory diagram illustrating a state in an exemplary embodiment in which a lid member has been placed in an open position.

As illustrated in FIG. 20, the projection 65 is engaged with the second groove portion 36 in the open state of the opening 26. The lid member 16 is thereby held in the open position. Note that the projection 66 is not engaged with the second groove portion 36. The lid member 16 has the projection 65 and the projection 66 inserted into the first longitudinal groove 32, and is not liable to come out in the D direction, enabling loss thereof to be prevented.

In the open state of the opening 26, the front wall 22B covers a portion of the lid member 16. This thereby suppresses foreign matter such as dust from penetrating in to the periphery of the packing 18, enabling foreign matter to be suppressed from adhering to the packing 18.

In the open state of the opening 26, the packing 18 does not contact the front wall 24B. Compression force accordingly does not act on the packing 18 in the open state, enabling deterioration of the packing 18 that occurs due to compression force acting on the packing 18 to be suppressed. In the open state of the opening 26 a gap is formed between the lid member 16 and the front wall 22B, and the lid member 16 and the front wall 22B do not make contact with each other. This thereby enables the formation of scratches due to the front face 62E, which is a design face of the lid member 16 (see FIG. 8), contacting the front wall 22B to be suppressed.

Figure 17:
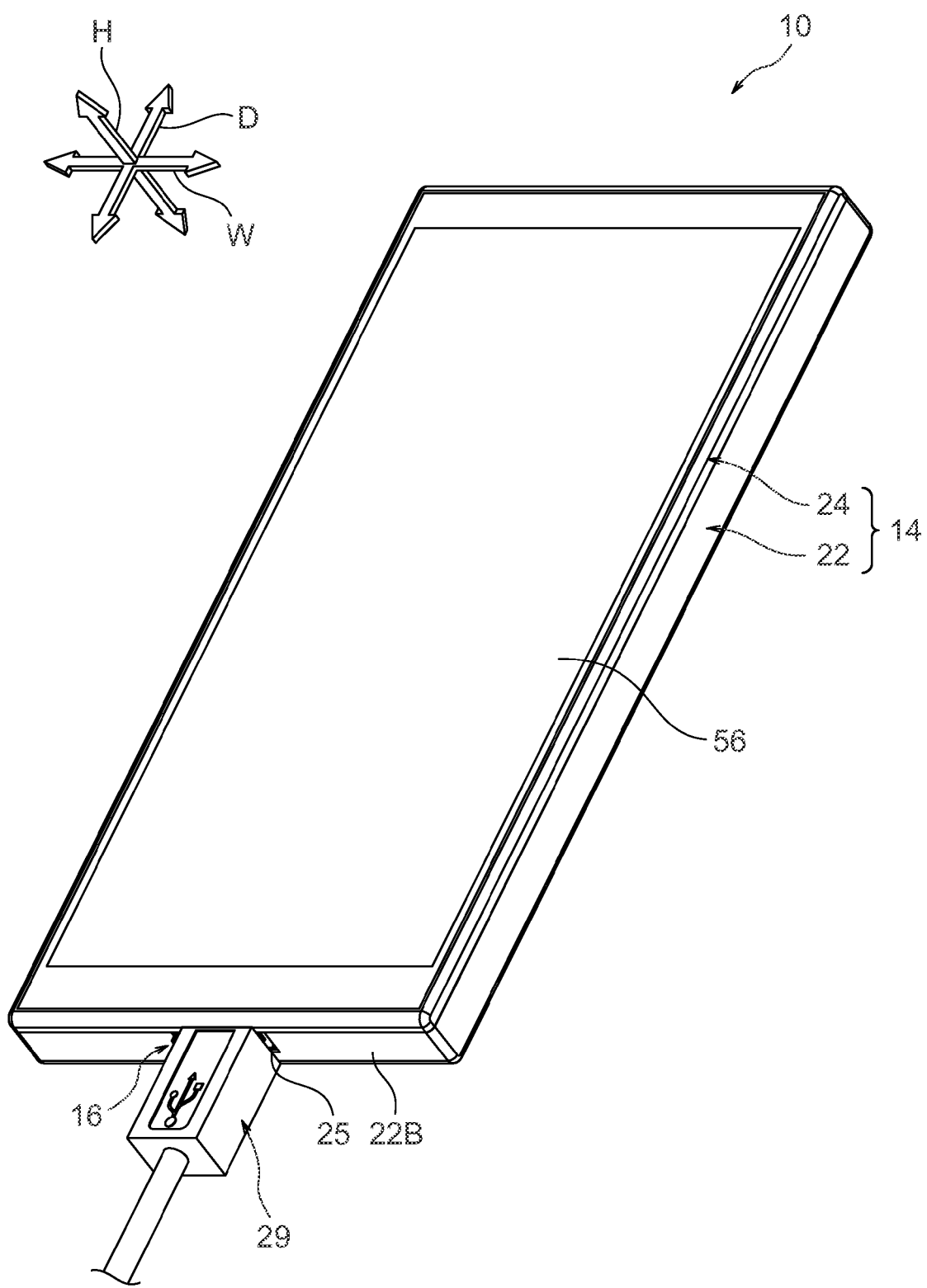
FIG. 17 is a perspective view of a smartphone of an exemplary embodiment.
Figure 18:
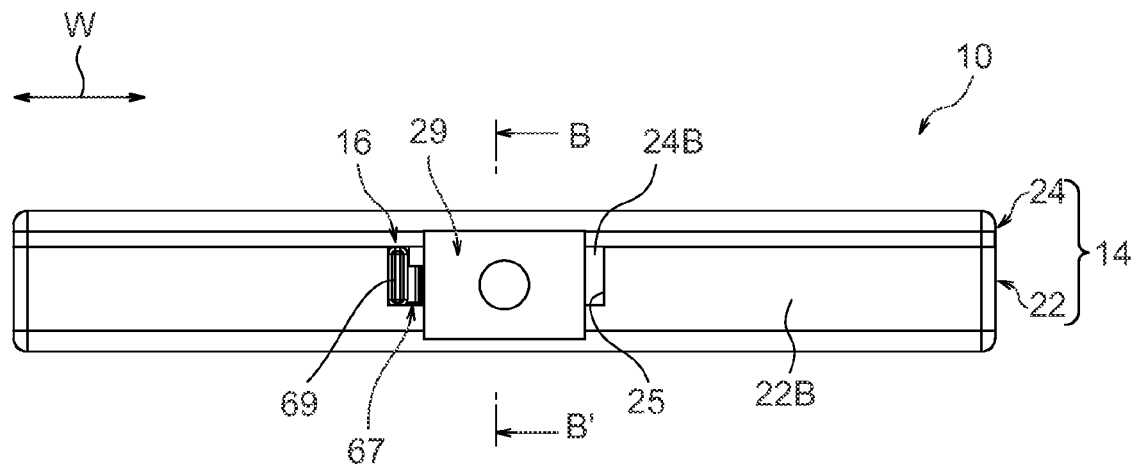
FIG. 18 is a face-on view of a smartphone of an exemplary embodiment.
Figure 19:
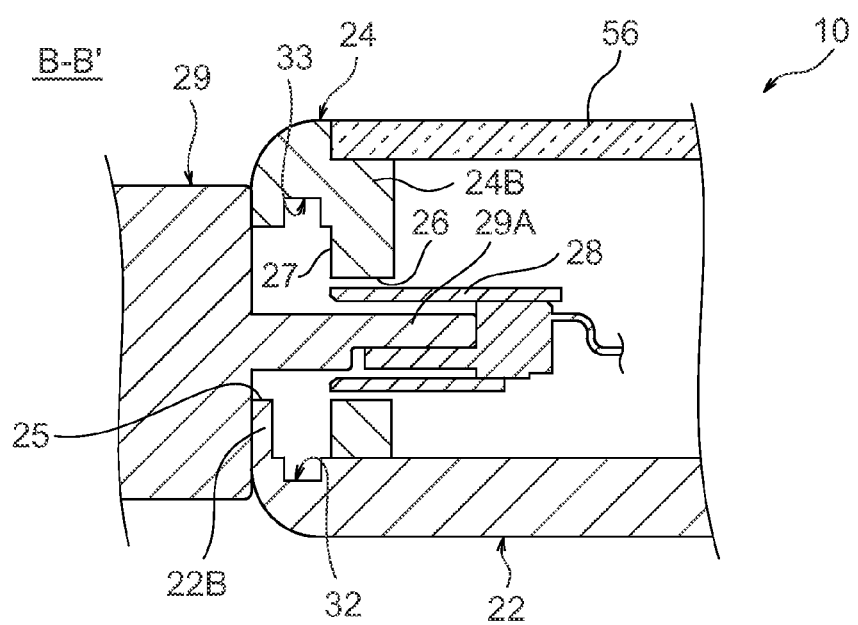
FIG. 19 is a partial vertical cross-section (a cross-section taken on line B-B' of FIG. 18) of a smartphone of an exemplary embodiment.

As illustrated in FIG. 19, in the open state of the opening 26, the plug 29A is connected to the jack 28. Thereby, as illustrated in FIG. 17 and FIG. 18, the USB cable 29 is connected to the smartphone 10, and data transmission, data reception, power supply, and the like is performed. While the USB cable 29 is connected to the smartphone 10, the lid member 16 is maintained in the open state, enabling suppression of the lid member 16 from interfering with the connection operation.

Closing the Opening

In the open state of the opening 26 as illustrated in FIG. 20, the grip 69 is moved to the W direction right side, and so the lid member 16 moves from the open position to the W direction right side. As the lid member 16 starts to move, the projection 65 is guided in the W direction by contact with the second groove portion 36, and so maintains an orientation along the W direction.

Figure 21:
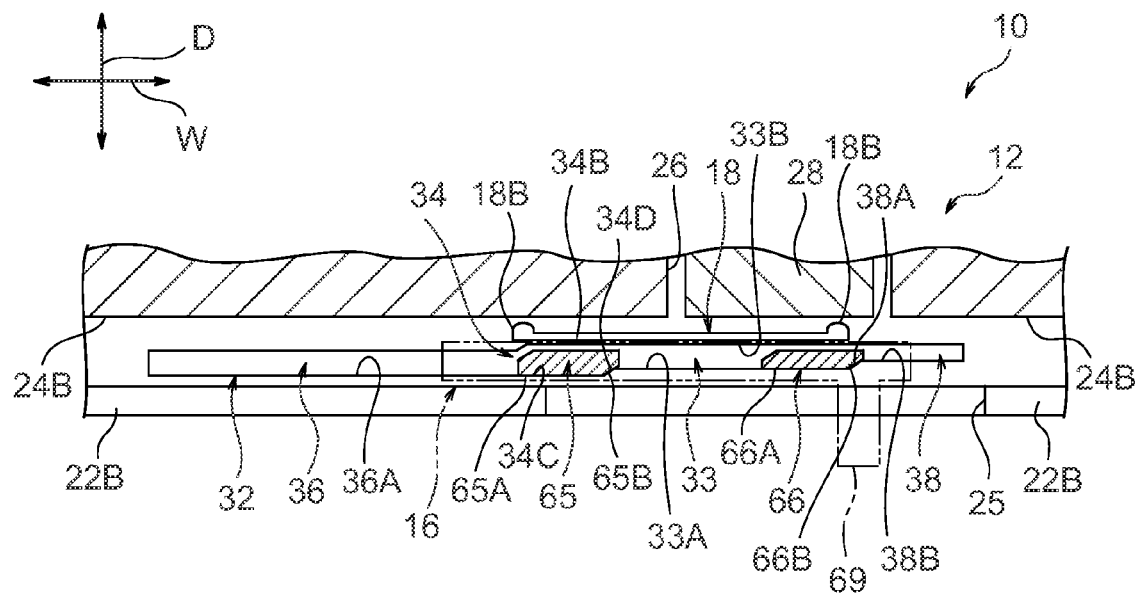
FIG. 21 is an explanatory diagram illustrating a state in an exemplary embodiment in which a lid member has been moved toward a closed position.

Subsequently, as illustrated in FIG. 21, the lid member 16 moves to the W direction right side, and when the projection 66 passes the wide width groove portion 34 and reaches the first groove portion 33, the front face 66A of the projection 66 is positioned further to the D direction far side than the front face 65A of the projection 65. The displacement length d8-d9 in the D direction between the front face 66A and the front face 65A (see FIG. 13) is the same as the length d2 in the D direction from the front wall 22B to the wall face 33A (see FIG. 5). Thus on movement to the W direction right side, contact of the projection 66 with the inclined groove wall 34D is suppressed, and so tilting of the lid member 16 accompanying movement of the lid member 16 in the W direction can be suppressed. The packing 18 does not make contact with the front wall 24B at this time.

After the projection 66 has reached the first groove portion 33, the projection 65 enters the wide width groove portion 34, and so engagement between the projection 65 and the second groove portion 36 is released. The wall face 36A and the wall face 34C are in the same plane as each other at this time, enabling smooth W direction movement of the projection 65 and the projection 66.

Subsequently, as the lid member 16 continues to move toward the W direction right side, the inclined face 66B of the projection 66 is guided by the inclined face 38A, and the inclined face 65B of the projection 65 is also guided by the inclined groove wall 34D. The inclination angle of the inclined face 38A and the inclination angle of the inclined face 66B are the same as each other, and the inclination angle of the inclined groove wall 34D and the inclined face 65B are the same as each other, thereby enabling the lid member 16 to approach the opening 26 side in the W direction without disturbing the orientation of the lid member 16.

Figure 22:
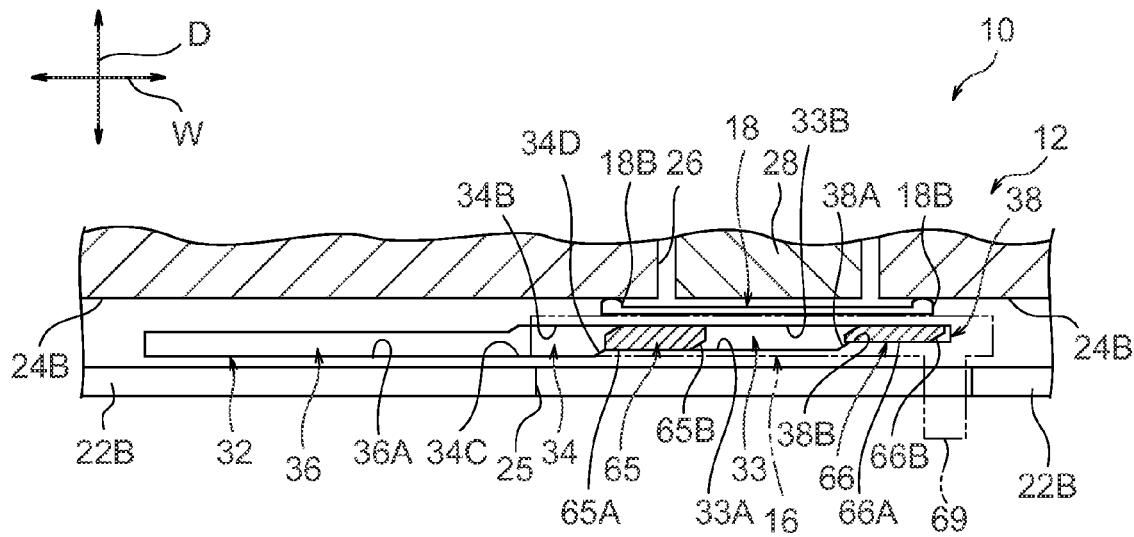
FIG. 22 is an explanatory diagram illustrating a state in an exemplary embodiment in which a lid member has been placed in a closed position.

Subsequently, as illustrated in FIG. 22, as the lid member 16 continues to move toward the W direction right side, the projection 66 enters the third groove portion 38 and engages with the third groove portion 38. The projection 65 also enters the first groove portion 33 and engages with the first groove portion 33. At this point in time, the packing 18 makes contact with the front wall 24B at the periphery of the opening 26. The orientation of the lid member 16 along the W direction is thereby maintained, and the lid member 16 is disposed in the closed position covering the opening 26. Note that the wall face 34B and the wall face 33B are in the same plane as each other, enabling smooth movement of the projection 65 in the W direction.

Figure 24:
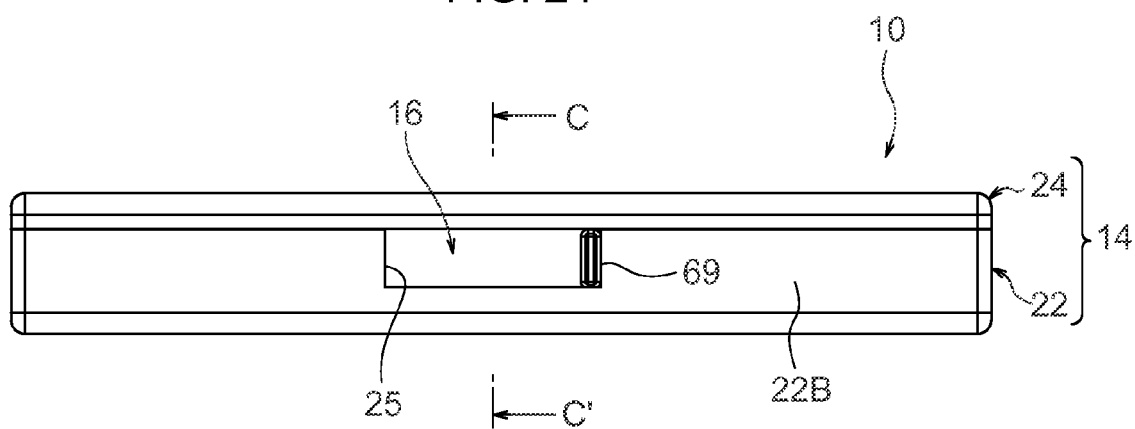
FIG. 24 is a face-on view of a smartphone of an exemplary embodiment.
Figure 25:
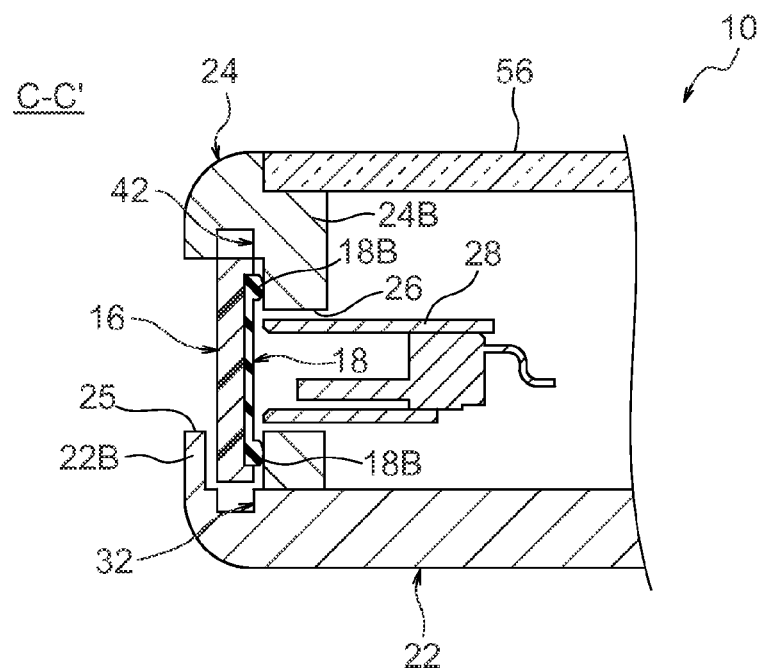
FIG. 25 is a partial vertical cross-section (a cross-section taken on line C-C' of FIG. 24) of a smartphone of an exemplary embodiment.

As illustrated in FIG. 24 and FIG. 25, when the lid member 16 is disposed in the closed position, as illustrated in FIG. 10, a noise occurs when the contacted portion 67A makes contact with the contact portion 31. This thereby enables the user, on hearing the noise, to ascertain that the lid member 16 has reached the closed position. If a user has moved the lid member 16 toward the closed position and there is no noise, then the user is able to ascertain that the lid member 16 is not disposed in the closed position.

Figure 23:
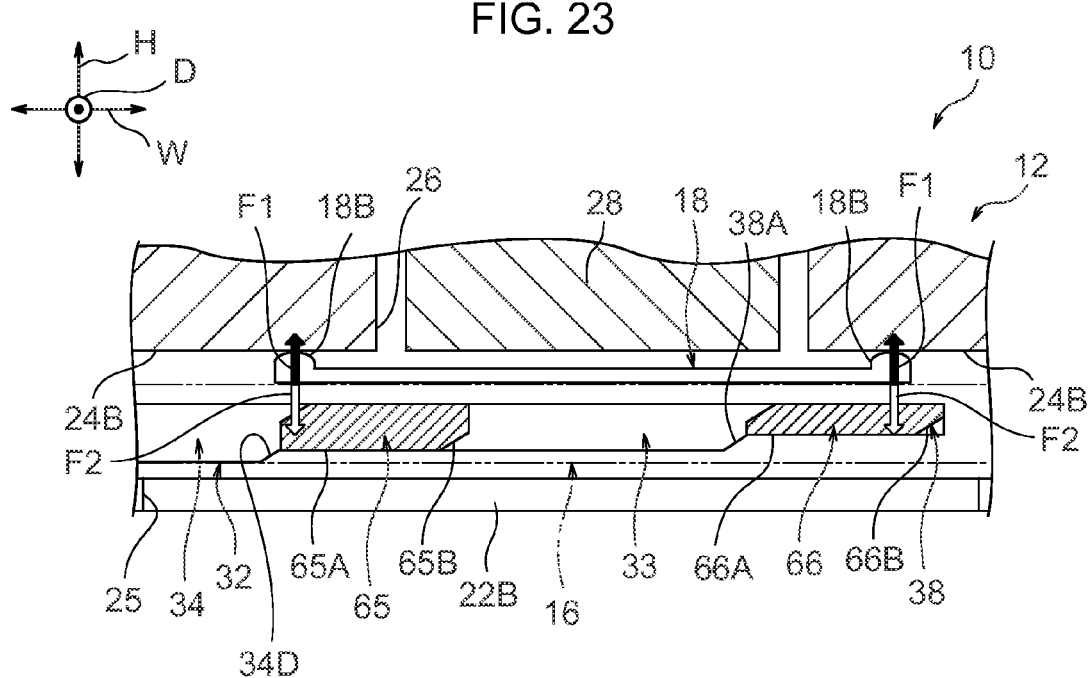
FIG. 23 is an explanatory diagram illustrating force acting on a lid member and packing in an exemplary embodiment.

Moreover, as illustrated in FIG. 23, when the lid member 16 is disposed in the closed position, movement of the lid member 16 in the D direction is suppressed by engagement of the first longitudinal groove 32 with the projection 65 and the projection 66. The peripheral edge portion 18B of the packing 18 is thereby nipped between the lid member 16 and the front wall 24B. Due to compression force F1 acting on the peripheral edge portion 18B, the close-contact performance (sealing performance) is raised between the packing 18 and the front wall 24B.

Namely, the waterproofing (ability to suppress water penetration) of the smartphone 10 and the lid opening-closing portion 12 is raised. In the smartphone 10 and the lid opening-closing portion 12, the lid member 16 can be suppressed from moving toward the open position by frictional force developing between the peripheral edge portion 18B and the front wall 24B. The amount of compression of the peripheral edge portion 18B can be set to a chosen compression amount by varying the dimensions of each longitudinal groove and each projection.

In the lid member 16, a reaction force F2 acts in response to the compression force F1. Thus when the lid member 16 is moved from the closed position toward the open position, the projection 65 and the projection 66 are pressed against the D direction near side of the first longitudinal groove 32. Thus, as illustrated in FIG. 20 and FIG. 21, when the lid member 16 is moved from the closed position to the open position, the projection 65 is guided by the wall faces 33A, 34C, 36A at the D direction near side. The projection 66 is also guided by the wall faces 38B, 33A at the D direction near side. When the lid member 16 has been moved from the closed position to the open position while being pressed toward the D direction far side, the inclined groove wall 34A (see FIG. 5) becomes the guide face for the projection 65 and the projection 66.

The packing 18 does not fit into the opening 26, and does not make contact with, nor is compressed by, the front wall 24B at the periphery of the opening 26, and so it is not necessary to control the dimensional precision to match the shape and size of the opening 26. The packing 18 is accordingly utilizable with various connectors and on plural models, enabling a reduction in development cost accompanying a reduction in design time, and a reduction in manufacturing costs to be achieved for other electronic devices.

As described above, with the smartphone 10 and the lid opening-closing portion 12, the opening 26 is opened or closed by a single action of moving the lid member 16 in the W direction, enabling the operability of the lid member 16 to be raised. The convenience of the smartphone 10 is enhanced by raising the operability of the lid member 16.

In the smartphone 10 and the lid opening-closing portion 12, the groove width of the wide width groove portions 34, 44 is larger than that of the first groove portions 33, 43 and the second groove portions 36, 46. The moveable range of the lid member 16 in the wide width groove portions 34, 44 is thereby made larger than in a configuration in which the groove width of the wide width groove portions 34, 43 is the same as that of the first groove portions 33, 43 and the second groove portions 36, 46. Insertion operation of the lid member 16 into the wide width groove portions 34, 44 can accordingly be performed smoothly when moving the lid member 16 toward the opening 26.

In the smartphone 10 and the lid opening-closing portion 12, the lid member 16 includes the projections 63, 64, 65, 66 that have a smaller width than the body 62. The projections 63, 64, 65, 66 move in the first longitudinal groove 32 and in the second longitudinal groove 42. There is accordingly a smaller contact surface area with the inside of the first longitudinal groove 32 and the second longitudinal groove 42 than in a configuration in which the upper end portion and lower end portion of the body 62 are guided in the first longitudinal groove 32 and the second longitudinal groove 42, thereby enabling smooth movement of the lid member 16.

As illustrated in FIG. 23, in the smartphone 10 and the lid opening-closing portion 12, the projection 65 and the projection 66 are disposed at both the W direction left and right sides across the opening 26. The projection 63 and the projection 64 (see FIG. 8) are moreover disposed aligned in rows with the projection 65 and the projection 66 in the H direction, above and below the opening 26. Rotation of the lid member 16 in the W-D plane, in the W-H plane, and in the D-H plane is accordingly suppressed. The separation between the lid member 16 and the front wall 24B is suppressed from being different along the W direction, and so non-uniform compression force can be suppressed from acting on a portion of the packing 18.

As illustrated in FIG. 5 and FIG. 13, in the smartphone 10 and the lid opening-closing portion 12, the length W10 from the left side face 65F of the projection 65 to the right side face 66C of the projection 66 is the same as length (W3+W4) that is the overall length of the first groove portion 33. This thereby enables the packing 18 to be compressed in a state in which the projection 63 (see FIG. 12) and the projection 65 are disposed at the left side of the opening 26, and the projection 64 (see FIG. 12) and the projection 66 are disposed at the right side of the opening 26. This thereby enables uneven compression force to be suppressed from acting on a portion of the packing 18, compared to cases configured with protrusions disposed on one or other of the left or right of the lid member 16. The length (W3+W4) may be the length W10 or greater.

In the smartphone 10 and the lid opening-closing portion 12, as illustrated in FIG. 13, the rear face 65D of the projection 65 and the rear face 66D of the projection 66 are aligned in the W direction. Thus when a user moves the lid member 16 in the W direction while pressing the lid member 16 toward the D direction far side, the rear faces of each of the projections make contact with, and are guided by, the respective faces at the D direction far side of the first longitudinal groove 32, suppressing the separation between the lid member 16 and the front wall 24B from differing at each portion of the lid member 16. This thereby enables uneven compression force to be suppressed from acting on a portion of the packing 18.

In the smartphone 10 and the lid opening-closing portion 12, as illustrated in FIG. 13, the D direction thickness of the projection 66 is d9, which is thinner than the D direction thickness d8 of the projection 65. Accordingly, for example as illustrated in FIG. 21, a gap develops between the projection 66 and the first groove portion 33 when the projection 65 moves from the second groove portion 36 to the wide width groove portion 34. There is accordingly freedom for the lid member 16 to move in the D direction in the interval in which the projection 66 is moving within the first groove portion 33, and since compression force accordingly is less liable to act on the packing 18, the compression force acting on the packing 18 can be suppressed from increasing partway through the lid member 16 moving toward the closed position.

In the smartphone 10 and the lid opening-closing portion 12, as illustrated in FIG. 23, the length of the third groove portion 38 and the length of the projection 66 are the same as each other in the W direction. The third groove portion 38 and the projection 66 are accordingly engaged (in contact with) each other along the W direction, enabling resistance to the reaction force F2 even though the D direction thickness of the projection 66 is thinner than that of the projection 65.

In the smartphone 10 and the lid opening-closing portion 12, as illustrated in FIG. 5 and FIG. 13, the inclination angle with respect to the W direction is the same for the inclined faces 65B, 66B, and the inclined groove walls 34D, 38A. When the lid member 16 is moved in the W direction, the orientation of the lid member 16 can accordingly be suppressed from tilting in the W direction due to the guiding directions of the lid member 16 being aligned by contact of the projection 65 and the projection 66 with the first longitudinal groove 32.

In the smartphone 10 and the lid opening-closing portion 12, as illustrated in FIG. 9, the packing 18 is placed at the inside of the region S corresponding to from the outer end of the projection 65 to the outer end of the projection 66. Accordingly, even if the reaction force F2 acting from the packing 18 toward the lid member 16 is large (see FIG. 23), the reaction force F2 is resisted by contact of the projection 65 and the projection 66 with the first longitudinal groove 32, enabling the lid member 16 to be suppressed from becoming misaligned from the closed position in the D direction.

In the smartphone 10 and the lid opening-closing portion 12, as illustrated in FIG. 22, in the closed state in which the lid member 16 is at the closed position, the lid member 16 covers the wide width groove portion 34. This thereby enables penetration of foreign matter into the wide width groove portion 34 to be suppressed in the closed state of the opening 26 in the smartphone 10 and the lid opening-closing portion 12.

In the smartphone 10 and the lid opening-closing portion 12, as illustrated in FIG. 10, the grip 69 protrudes further out to the D direction near side than the front wall 22B adjacent to the protrusion 67, enabling release of the contact state between the contacted portion 67A and the contact portion 31 to be achieved simply.

In the smartphone 10 and the lid opening-closing portion 12, as illustrated in FIG. 9, the packing 18 includes the fixed portion 18A, and the closed curve shaped peripheral edge portion 18B provided at the peripheral edge of the fixed portion 18A. Thus the entire inside of the peripheral edge portion 18B is a fixed region, enabling the packing 18 to be suppressed from coming away from the lid member 16.

Explanation next follows regarding modified examples of the present exemplary embodiment.

Figure 26:
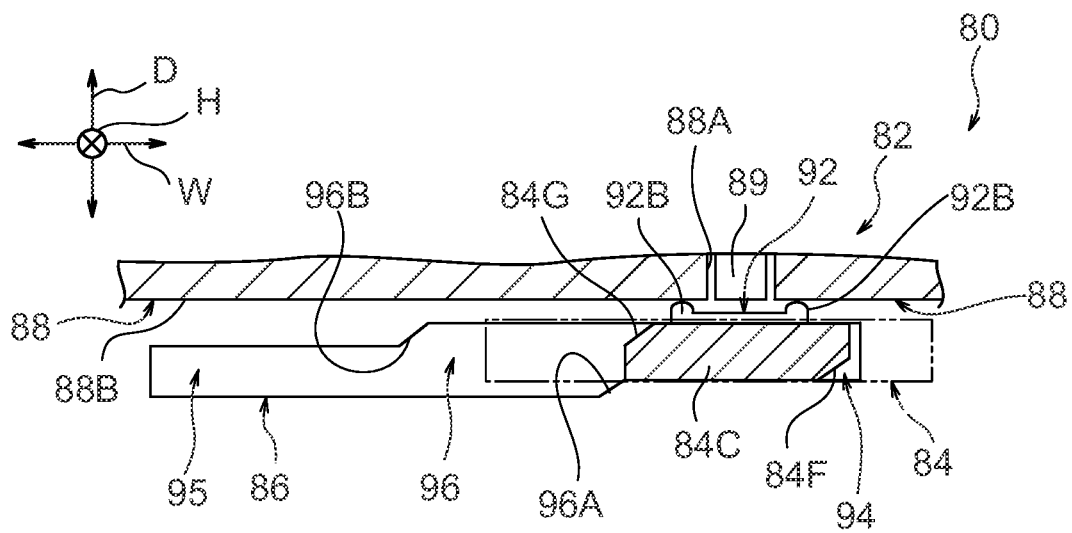
FIG. 26 is an explanatory diagram illustrating a state in which a lid member of a modified example has been placed in a closed position.

FIG. 26 illustrates a lid opening-closing portion 80. The lid opening-closing portion 80 is provided in place of the lid opening-closing portion 12 of the smartphone 10 (see FIG. 1). The lid opening-closing portion 80 includes a case 82, a lid member 84, and packing 92. The case 82 includes longitudinal grooves 86 serving as an example of longitudinal grooves. The lid member 84 is an example of a lid. The packing 92 is an example of a resilient member.

The case 82 includes a front wall 88 as an example of a wall portion. The front wall 88 is a side wall at the D direction near side of the case 82. The front wall 88 includes an opening 88A piercing through in the D direction, and a side face 88B running along the W direction at the D direction near side. The opening 88A is, as an example, circular shaped as viewed along the D direction. A connector 89 is, as an example, provided inside the opening 88A.

Each of the longitudinal grooves 86 includes a first groove portion 94, a second groove portion 95, and a wide width groove portion 96. The longitudinal grooves 86 are formed to the case 82 at the D direction near side of the front wall 88, and are arranged in a row above and below the opening 88A in the H direction. Note that since the H direction upper and lower longitudinal grooves 86 are configured the same as each other, explanation follows regarding the H direction lower side longitudinal groove 86, and explanation regarding the H direction upper side longitudinal groove 86 is omitted.

As viewed along the H direction, the first groove portion 94 faces toward the opening 88A and extends in the W direction. As viewed along the H direction, the second groove portion 95 is positioned separated from the opening 88A to the W direction left side, and extending along the W direction. The first groove portion 94 and the second groove portion 95 are connected to inclined groove walls 96A, 96B of the wide width groove portion 96. The groove width of the first groove portion 94 and the groove width of the second groove portion 95 are, as an example, the same as each other. The groove width of the wide width groove portion 96 is larger than the groove width of the first groove portion 94 and the groove width of the second groove portion 95.

The inclined groove wall 96A is connected to the D direction near side face of the first groove portion 94, and to the D direction near side face of the second groove portion 95. The inclined groove wall 96B is connected to the D direction far side face of the first groove portion 94, and to the D direction far side face of the second groove portion 95. The inclination angles with respect to the W direction of the inclined groove wall 96A and the inclined groove wall 96B are, as an example, the same as each other.

Figure 27:
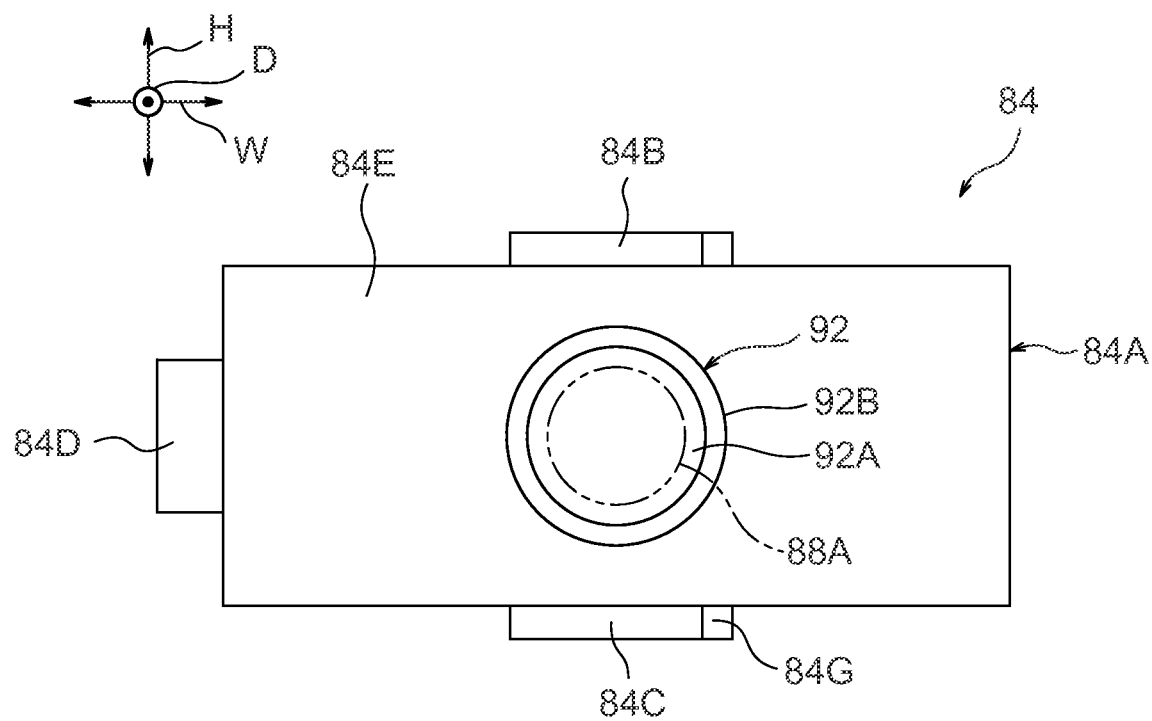
FIG. 27 is a back view of a lid member of a modified example.

As illustrated in FIG. 27, the lid member 84 includes a body 84A, and, as examples of projections, projections 84B, 84C, and projection 84D.

As viewed along the D direction, the body 84A is formed in a rectangular shape with the long direction along the W direction. The projection 84B protrudes from a W direction center and H direction upper end of the body 84A, upward along the H direction. The projection 84C protrudes from a W direction center and H direction lower end of the body 84A, downward along the H direction. The projection 84C has a rectangular shaped external profile as viewed along the D direction, with an inclined face 84F (see FIG. 26) and an inclined face 84G formed at locations that are a pair of diagonally opposite corners.

The D direction thickness of the projection 84B and the projection 84C is a thickness that engages with the first groove portion 94 and the second groove portion 95. The inclined face 84F and the inclined face 84G have, as an example, inclination angles with respect to the W direction that are the same as those of the inclined groove wall 96A and the inclined groove wall 96B (see FIG. 26). Note that the projection 84B has, as an example, the same external profile and same size as the projection 84C, and so explanation of the projection 84C is omitted.

The projection 84D projects from one W direction end of the body 84A, along the W direction toward the outside. Packing 92 is fixed to a central portion of a rear face 84E that is the D direction far side face of the body 84A. The packing 92 includes, as an example, a circular plate shaped fixed portion 92A, and a circular ring shaped peripheral edge portion 92B that protrudes from the peripheral edge of the fixed portion 92A toward the D direction far side. The internal diameter of the peripheral edge portion 92B is larger than the external diameter of the opening 88A. The external diameter of the peripheral edge portion 92B is, as an example, smaller than the W direction width of the projection 84C.

As illustrated in FIG. 26, when the lid member 84 has been moved along the W direction from an open position to a closed position, the projection 84C moves from the second groove portion 95 to the wide width groove portion 96, is guided by the inclined groove wall 96A, and moves to the first groove portion 94. The lid member 84 is then held in the closed position by engagement between the projection 84C and the first groove portion 94. In the packing 92, the peripheral edge portion 92B is nipped between the lid member 84 and the front wall 88, and compressed. The number of projections provided to the lid member may accordingly be set as one each, above and below in the H direction.

In the above exemplary embodiment, the smartphone 10 is given as an example of an electronic device. However, the electronic device is not limited to the smartphone 10, and examples of electronic devices include, for example, a portable device such as a mobile phone, a camera, a portable audio reproduction device, or a personal computer, audio equipment, or a tablet terminal.

The case 14 may be formed such that the front wall 24B is disposed further to the D direction near side than the front wall 22B, with the opening 26 formed in the front wall 22B, and the cutout 25 formed in the front wall 24B. The profile of the opening 26 is not limited to a rectangular shape or a circular shape, and may be an elliptical shape or another polygonal shape. The jack 28 is not necessarily disposed inside the opening 26, and may be disposed further to the D direction far side than the front wall 24B. The case 14 may be configured without the front wall 22B. In addition, the case 14 may be configured so as not to be formed with the contact portion 31.

The lid member 16 is not limited to being rectangular shaped as viewed along the D direction, and may be circular shaped, elliptical shaped, or shaped as another polygon. The lid member 16 may be formed without the contacted portion 67A formed to the protrusion 67, and may be configured so as not to be formed with the protrusion 67. A tension spring may be attached to the W direction left end of the lid member 16, so as to pull the lid member 16 toward the open position. This thereby enables the opening action of the lid member 16 to be performed simply.

A coil spring may be provided at the W direction left end of the lid member 16, so as to bias the lid member 16 toward the closed position. This thereby enables the closing action of the lid member 16 to be performed simply. In addition, the lid member 16 may be moved by a motor.

The projections are not limited to plate tabs such as the projection 63, the projection 64, the projection 65, and the projection 66, and may be formed in a circular pillar shape or a semi-spherical shape. The projections are not limited to being formed in pairs of upper and lower locations such as the projection 63, the projection 64, the projection 65, and the projection 66, and may be formed in sets of 3 upper and lower locations. Each of the projections is not limited to being formed in a rectangular shape with inclined faces on a pair of diagonally opposite corners, and may be formed with curved faces. Each of the projections may be formed so as not to engage with the longitudinal groove when the lid member 16 is held in the open position or closed position by a holding member.

The projection 65 and the projection 66 may have lengths from one outer end to the other outer end that differ in length to the overall length of the first groove portion 33. The projection 63 and the projection 64 may have lengths from one outer end to the other outer end that differ in length to the overall length of the first groove portion 43. The W direction lengths of the projection 64 and the projection 66 may differ from the lengths of the third groove portion 38 and the third groove portion 48.

The resilient member is not limited to one that includes the fixed portion 18A and the peripheral edge portion 18B such as the packing 18, and may include the peripheral edge portion 18B only. The resilient member may also extend as far as the outside of a region corresponding to from an outer end of a first projection to the outer end of the second projection.

The connection member is not limited to the USB jack 28, and may be an earphone jack, or a connector that performs electrical connection to another external device.

Explanation has been given above of exemplary embodiments of technology disclosed herein, however the technology disclosed herein is not limited to the above, and obviously various modifications are implementable within a scope not departing from the spirit thereof According to technology disclosed herein, operability of a lid can be enhanced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

All cited documents, patent applications and technical standards mentioned in the present specification are incorporated by reference in the present specification to the same extent as if the individual cited documents, patent applications and technical standards were specifically and individually incorporated by reference in the present specification.

What is claimed is:

1. An electronic device comprising:
   a case including
      a wall portion including an opening, and
      a pair of longitudinal grooves extending along a side face of the wall portion,
   wherein
      each of the longitudinal grooves includes
         a first groove portion that is disposed with the opening between the first groove portions;
         a second groove portion that is disposed at a position separated from the opening and is contiguous to the first groove portion through an inclined groove wall;
   a lid that moves along the longitudinal grooves, and that is brought closer to the wall portion by the inclined groove wall under an action of moving the lid to the first groove portion;
   a resilient member that is provided at the lid, and that is compressed by the wall portion and the lid at the periphery of the opening by the action of moving the lid closer to the wall portion; and
   a connection member that is electrically connected to an electronic component inside the case, and that is exposed from the opening when the opening is opened.

2. The electronic device of claim 1, wherein each of the longitudinal grooves further includes a wide width groove portion that has a greater groove width than the groove widths of the first groove portion and the second groove portion and that is formed with the inclined groove wall.

3. The electronic device of claim 1, wherein:
   the lid includes a projection that moves inside the longitudinal groove; and
   the lid is brought closer to the wall portion under an action of moving the projection to the first groove portion.

4. The electronic device of claim 3, wherein:
   the projection includes a first projection that moves inside the longitudinal groove, and a second projection that is provided separated from the first projection and moves inside the longitudinal groove.

5. The electronic device of claim 4, wherein an overall length of the first groove portion is a length from an outer end of the first projection to an outer end of the second projection, or greater.

6. The electronic device of claim 4, wherein a face on the wall portion side of the first projection and a face on the wall portion side of the second projection are in the same plane as each other.

7. The electronic device of claim 4, wherein:
   a thickness of the first projection is a thickness so as to engage with the first groove portion and the second groove portion; and
   a third groove portion of smaller groove width than the groove width of the first groove portion is formed to the first groove portion at a terminal end of the first groove portion on an opposite side to the wide width groove portion side.

8. The electronic device of claim 7, wherein:
   an overall length of the third groove portion is a length of the second projection or greater.

9. The electronic device of claim 7, wherein:
the inclined groove wall is formed at a connection portion between the first groove portion and the second groove portion;
a first inclined face is formed at a connection portion between the first groove portion and the third groove portion; and
the first projection and the second projection are configured as plate tabs, and a second inclined face is formed at the first projection and the second projection along a direction of the inclined groove wall and the first inclined face.

10. The electronic device of claim 4, wherein:
the resilient member is disposed inside a region corresponding to from an outer end of the first projection to an outer end of the second projection.

11. The electronic device of claim 2, wherein:
a wall face on the wall portion side of the first groove portion and a wall face on the wall portion side of the wide width groove portion are in the same plane as each other; and
a wall face of the second groove portion on the opposite side to the wall portion side and a wall face of the wide width groove portion on the opposite side to the wall portion side are in the same plane as each other.

12. The electronic device of claim 1, wherein a covering portion, that covers a portion of the lid in an open state in which the opening is opened, is provided to the case.

13. The electronic device of claim 2, wherein a length of the lid is a length so as to cover the wide width groove portion in a closed state in which the opening is closed.

14. The electronic device of claim 1, wherein:
a protrusion portion that protrudes in an intersecting direction that intersects with the protrusion direction of the projection is formed at the lid; and
a contact portion is provided to the case so as to be disposed with a separation from the wall portion and so as to make contact with the protrusion portion in a closed state in which the opening is closed.

15. The electronic device of claim 1, wherein the resilient member includes:
a fixed portion that is fixed to the lid; and
a peripheral edge portion that protrudes from a peripheral edge of the fixed portion further to the wall portion side than the fixed portion.

* * * * *